Figures 3, 39:
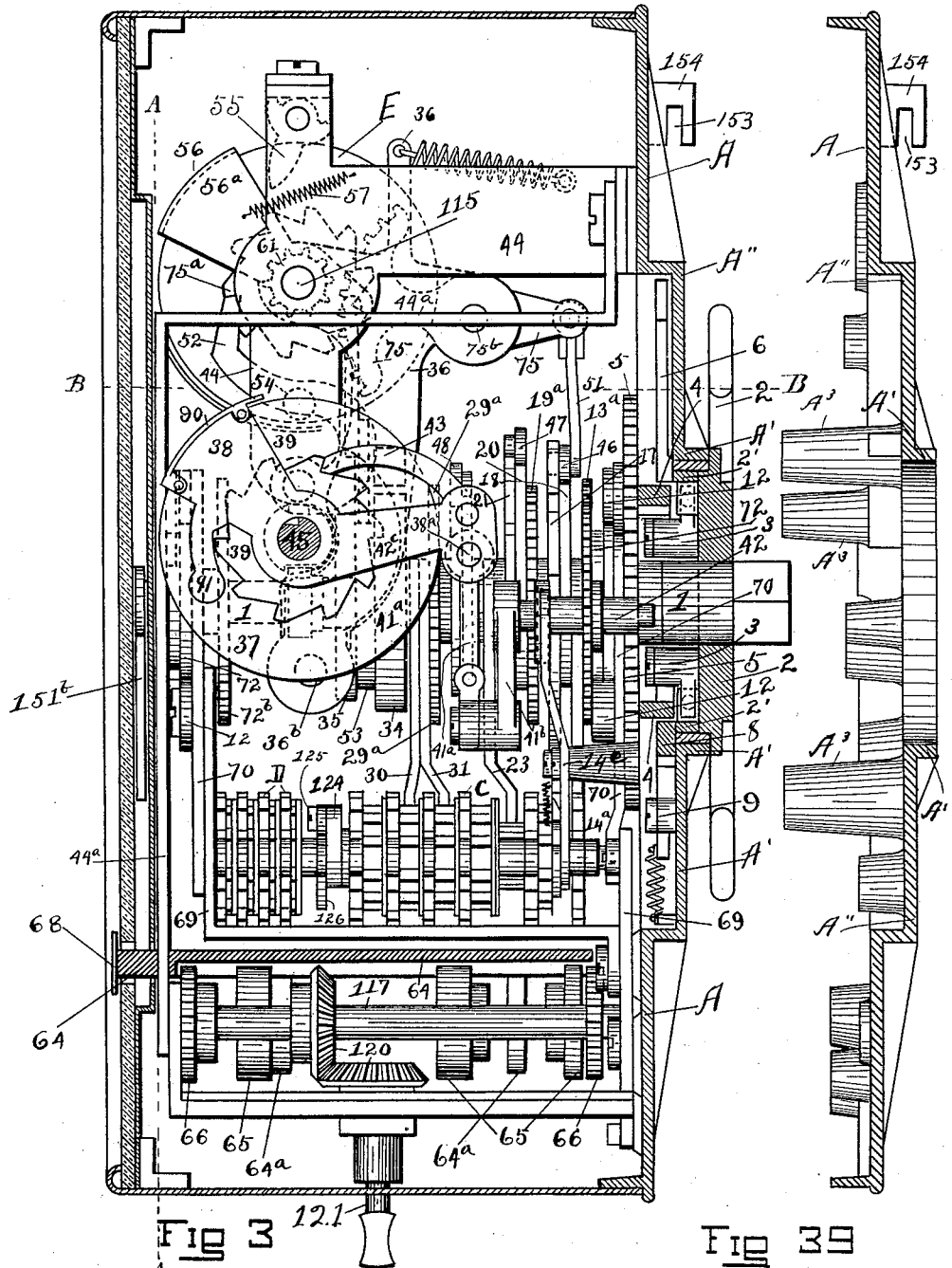

No. 758,488. PATENTED APR. 26, 1904.
H. TYLER.
FARE REGISTER.
APPLICATION FILED JAN. 13, 1903.
NO MODEL. 13 SHEETS—SHEET 1.
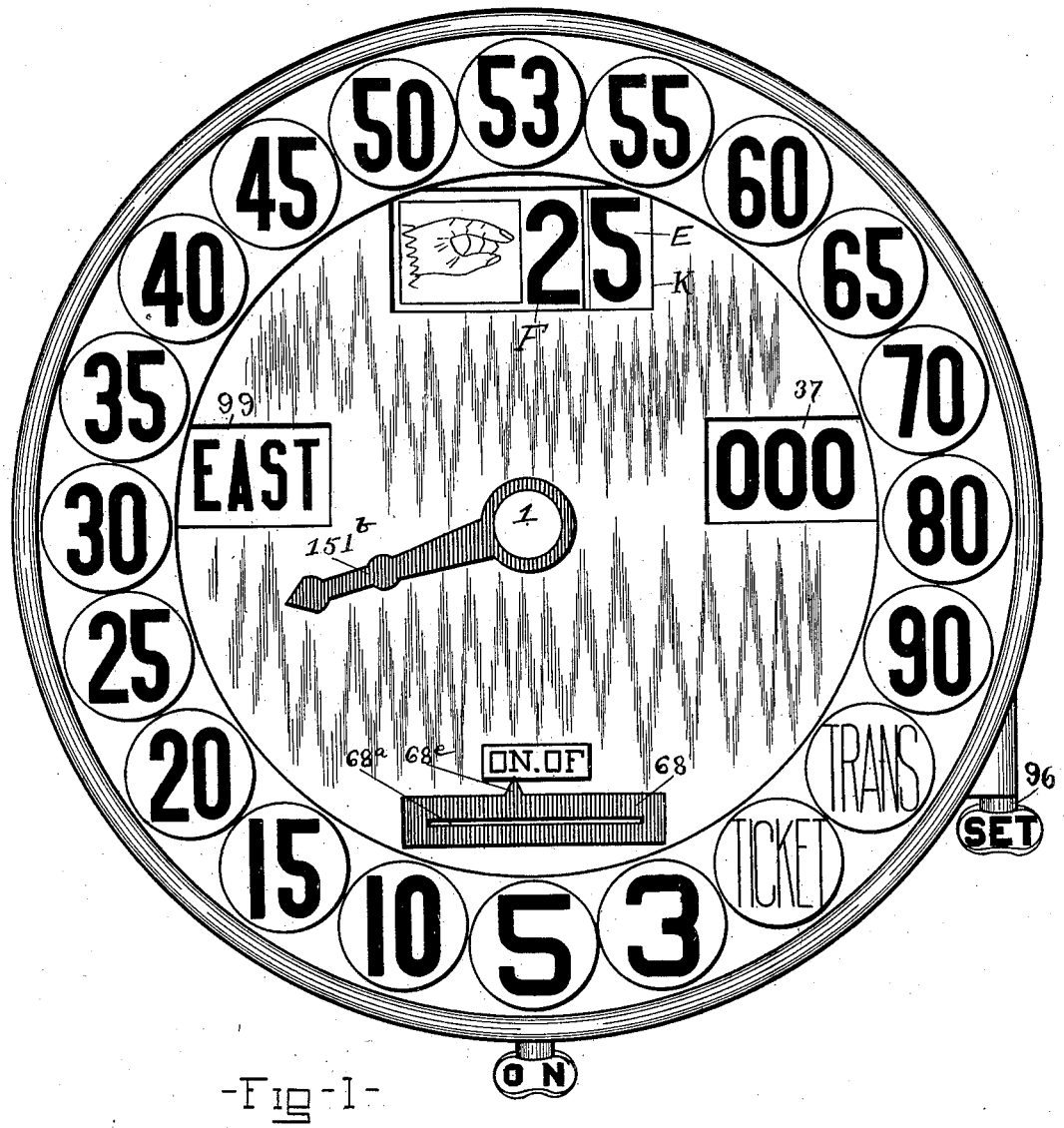
Fig-1-
WITNESSES-
Carolyn M. Theobald.
Matthew Siebler
Hiram Tyler,
INVENTOR
By R. J. McCarty
his ATTORNEY No. 758,488. PATENTED APR. 26, 1904.
H. TYLER.
FARE REGISTER.
APPLICATION FILED JAN. 13, 1903.
NO MODEL. 13 SHEETS—SHEET 2.
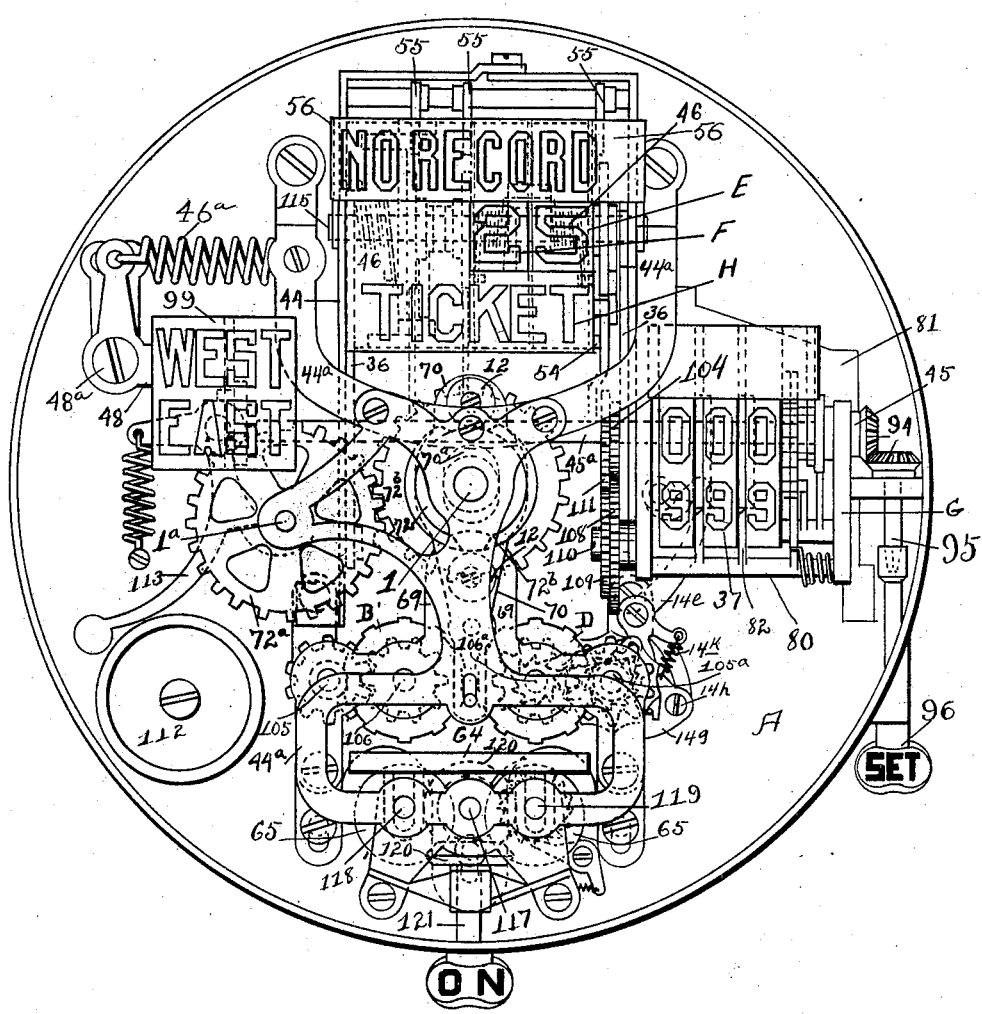
-Fig-2-
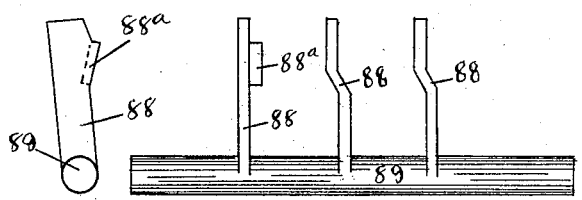
Fig 4O 4OA
WITNESSES
INVENTOR
ATTORNEY No. 758,488. PATENTED APR. 26, 1904.
H. TYLER.
FARE REGISTER.
APPLICATION FILED JAN. 13, 1903.
NO MODEL. 13 SHEETS—SHEET 3.

WITNESSES.
Carolyn M. Theobald
Matthew Sublar

Hiram Tyler
INVENTOR
By R. J. McCarty
ATTORNEY.

No. 758,488. PATENTED APR. 26, 1904.
H. TYLER.
FARE REGISTER.
APPLICATION FILED JAN. 13, 1903.
NO MODEL. 13 SHEETS—SHEET 5.

WITNESSES.
INVENTOR
ATTORNEY

No. 758,488. PATENTED APR. 26, 1904.
H. TYLER.
FARE REGISTER.
APPLICATION FILED JAN. 13, 1903.
NO MODEL. 13 SHEETS—SHEET 6.
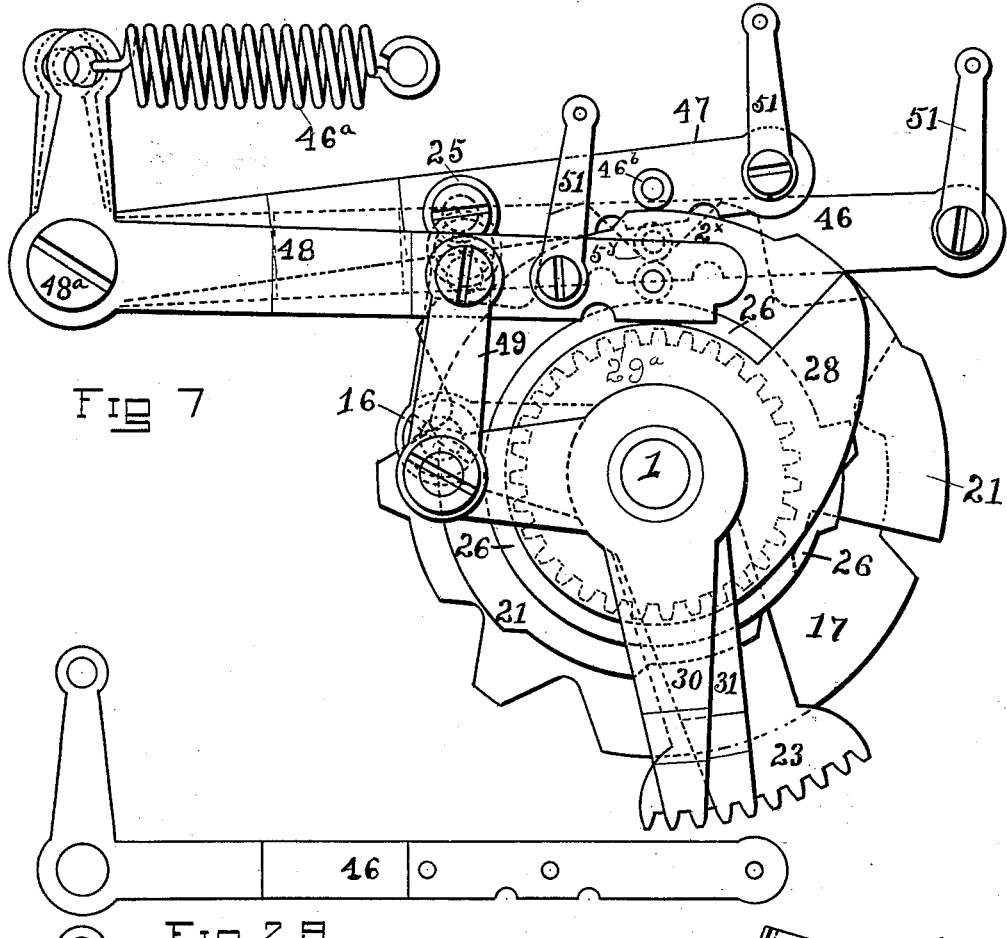
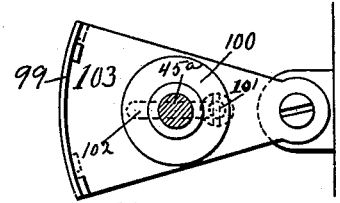
WITNESSES
Matthew Subler
Carolyn M. Theobald
INVENTOR
Hiram Tyler
By R. J. McCarty
ATTORNEY No. 758,488. PATENTED APR. 26, 1904.
H. TYLER.
FARE REGISTER.
APPLICATION FILED JAN. 13, 1903.
NO MODEL. 13 SHEETS—SHEET 7.
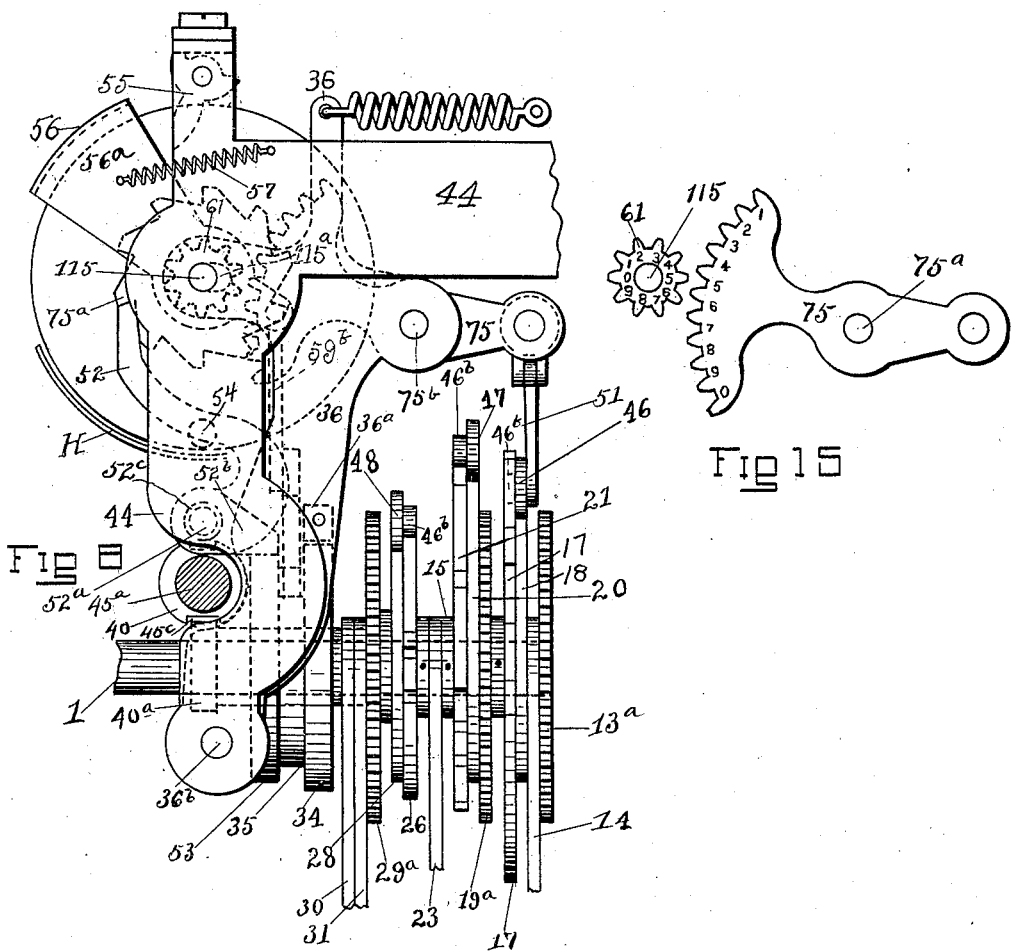
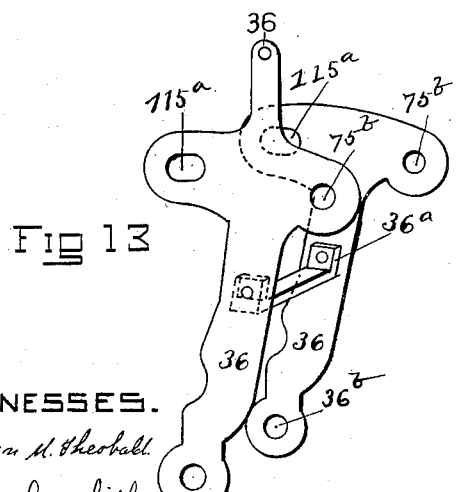
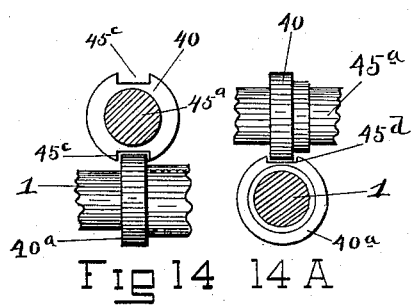
WITNESSES.
INVENTOR
ATTORNEY

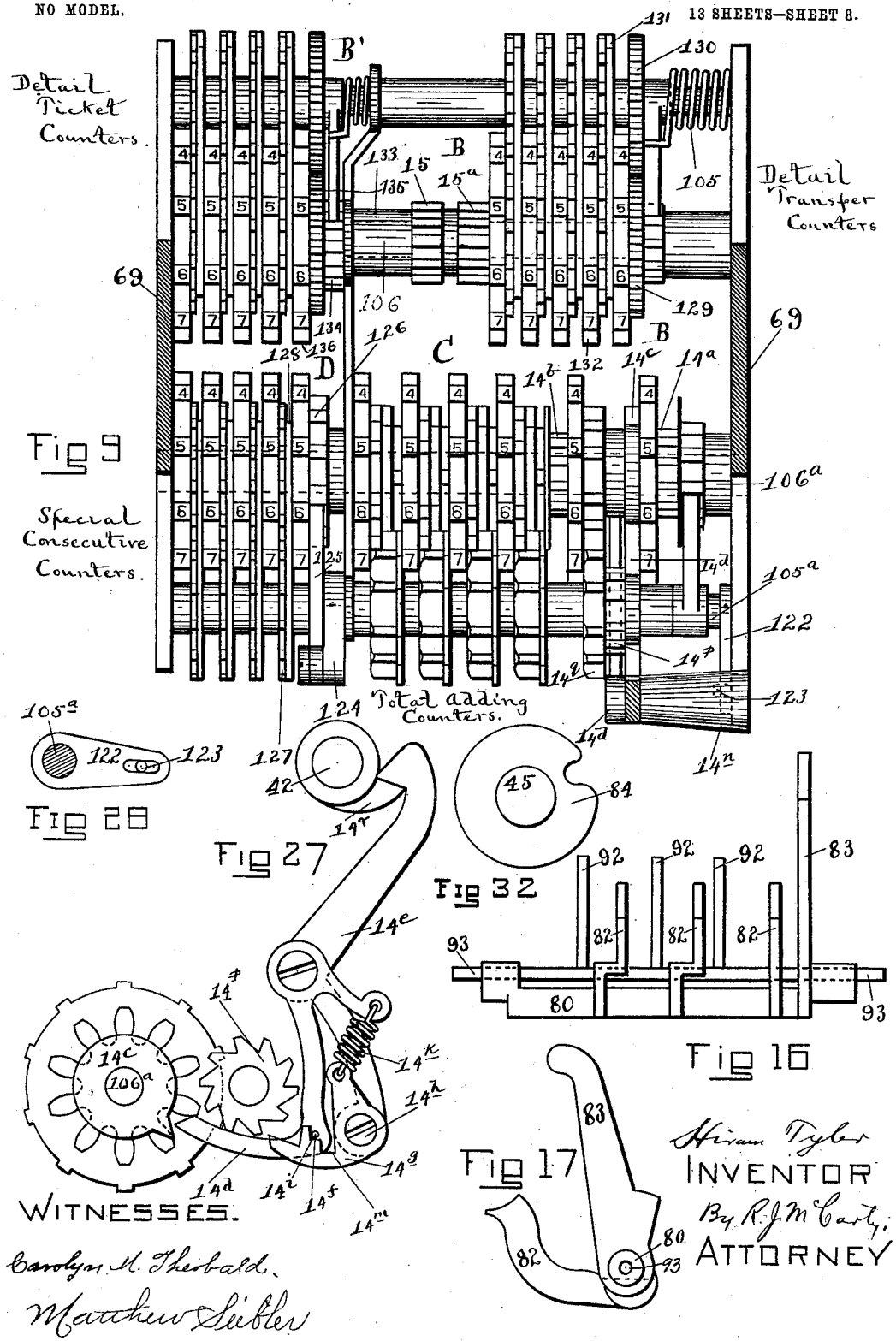

No. 758,488. PATENTED APR. 26, 1904.
H. TYLER.
FARE REGISTER.
APPLICATION FILED JAN. 13, 1903.
NO MODEL. 13 SHEETS—SHEET 9.

-Fig-10-

WITNESSES.                                  Hiram Tyler INVENTOR
                                            By R. J. McCarty ATTORNEY

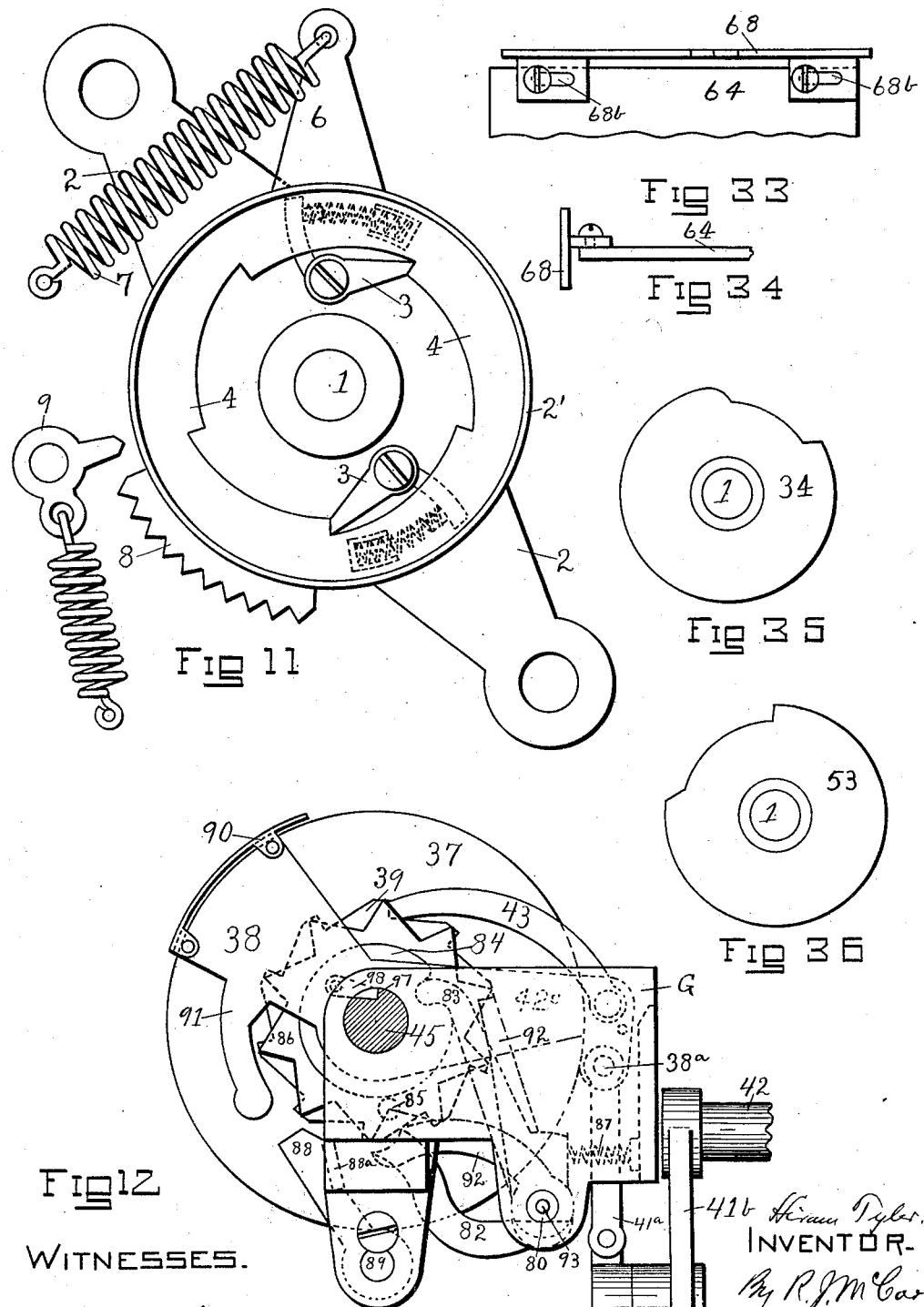

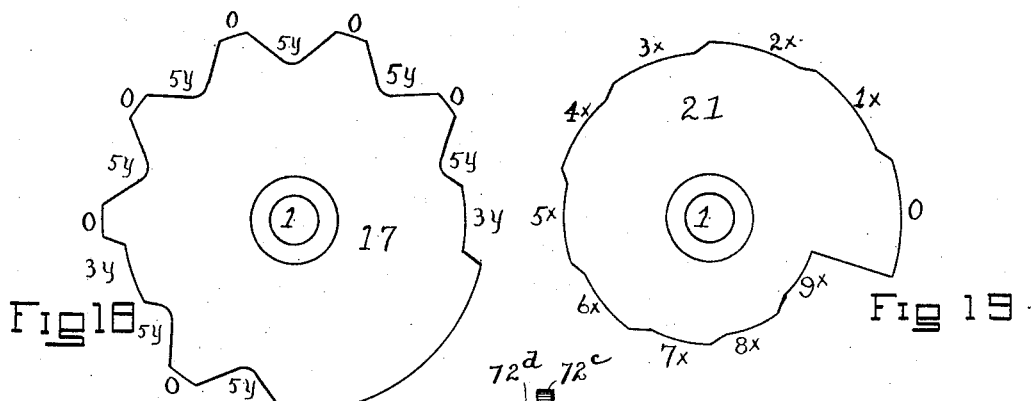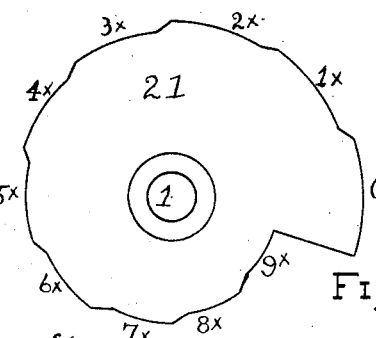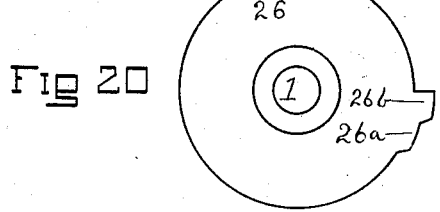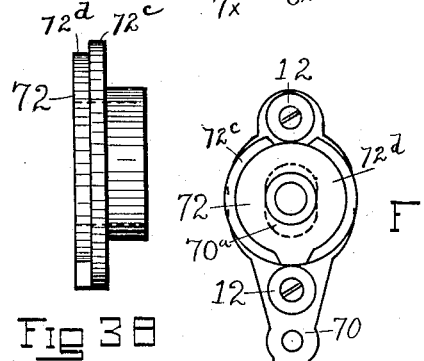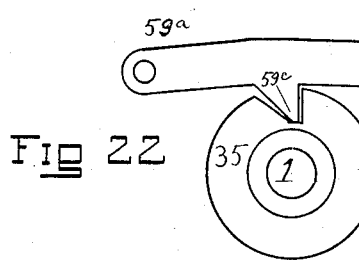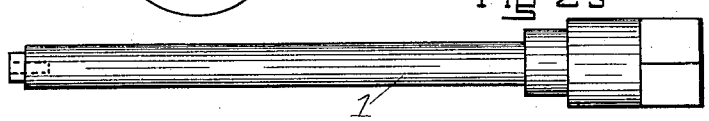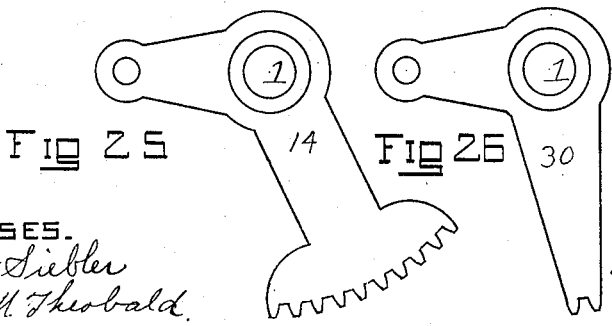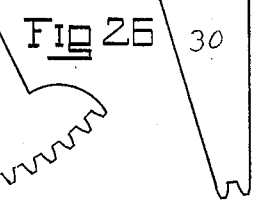

No. 758,488. PATENTED APR. 26, 1904.
H. TYLER.
FARE REGISTER.
APPLICATION FILED JAN. 13, 1903.
NO MODEL. 13 SHEETS—SHEET 12.
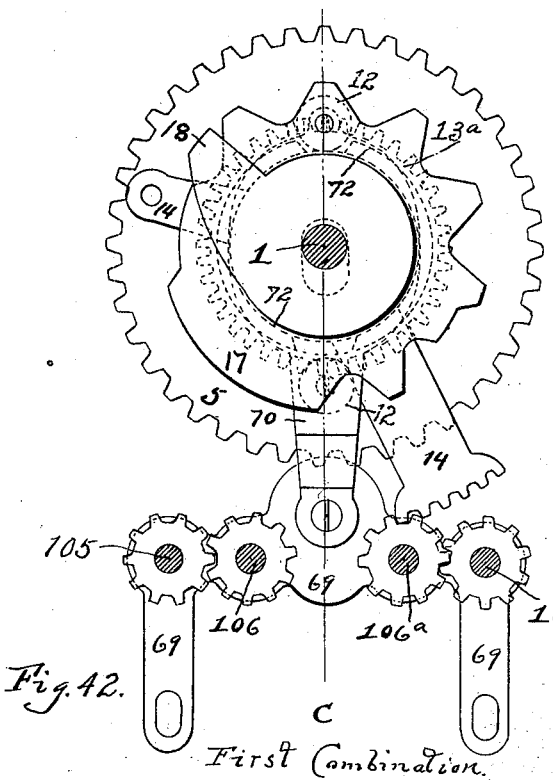
Fig. 42.
First Combination.
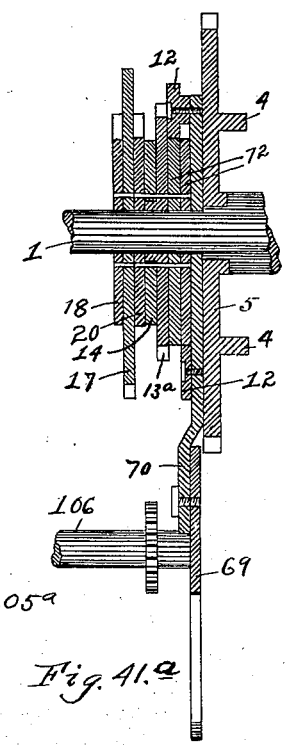
Fig. 41.ᵃ
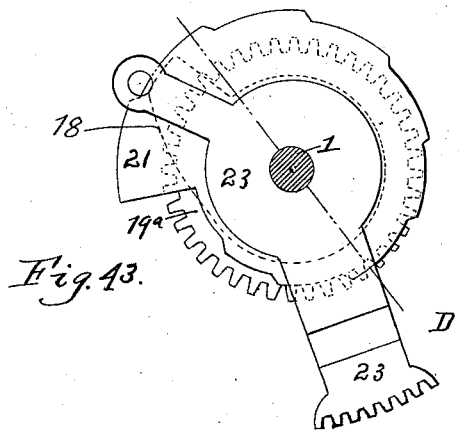
Fig. 43.
Second Combination.
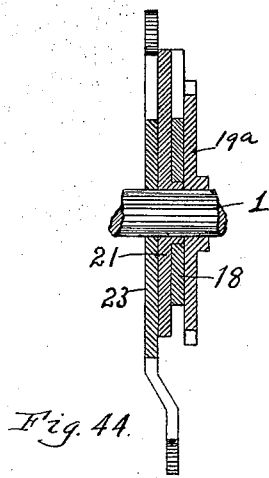
Fig. 44.

No. 758,488. PATENTED APR. 26, 1904.
H. TYLER.
FARE REGISTER.
APPLICATION FILED JAN. 13, 1903.
NO MODEL. 13 SHEETS—SHEET 13.

Third Combination.

Fourth Combination.

Witnesses
J. Fred Hemberger.
C. M. Theobald.

Hiram Tyler.
Inventor.
By R. J. McCarty,
his Attorney.

No. 758,488. Patented April 26, 1904.

UNITED STATES PATENT OFFICE.

HIRAM TYLER, OF DAYTON, OHIO, ASSIGNOR TO THE OHMER FARE REGISTER CO., OF DAYTON, OHIO.

FARE-REGISTER.

SPECIFICATION forming part of Letters Patent No. 758,488, dated April 26, 1904.

Application filed January 13, 1903. Serial No. 138,872. (No model.)

*To all whom it may concern:*

Be it known that I, HIRAM TYLER, a citizen of the United States, residing at Dayton, in the county of Montgomery and State of Ohio, have invented certain new and useful Improvements in Fare-Registers; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention comprises a combined detail and total-adding fare-register.

The object of the invention is to provide a register of the above type with an increased capacity for registering and indicating a multiplicity of fares of different denominations and which occupies a minimum amount of space.

The essential features of the invention consists in means for keeping a total record of the cash fares separately, a total record of the transfers and tickets separately, and in keeping a grand total of all the fares registered and indicated irrespective of their denominations or classes.

Preceding a detail description of the invention, reference is made to the accompanying drawings, of which—

Figure 4:
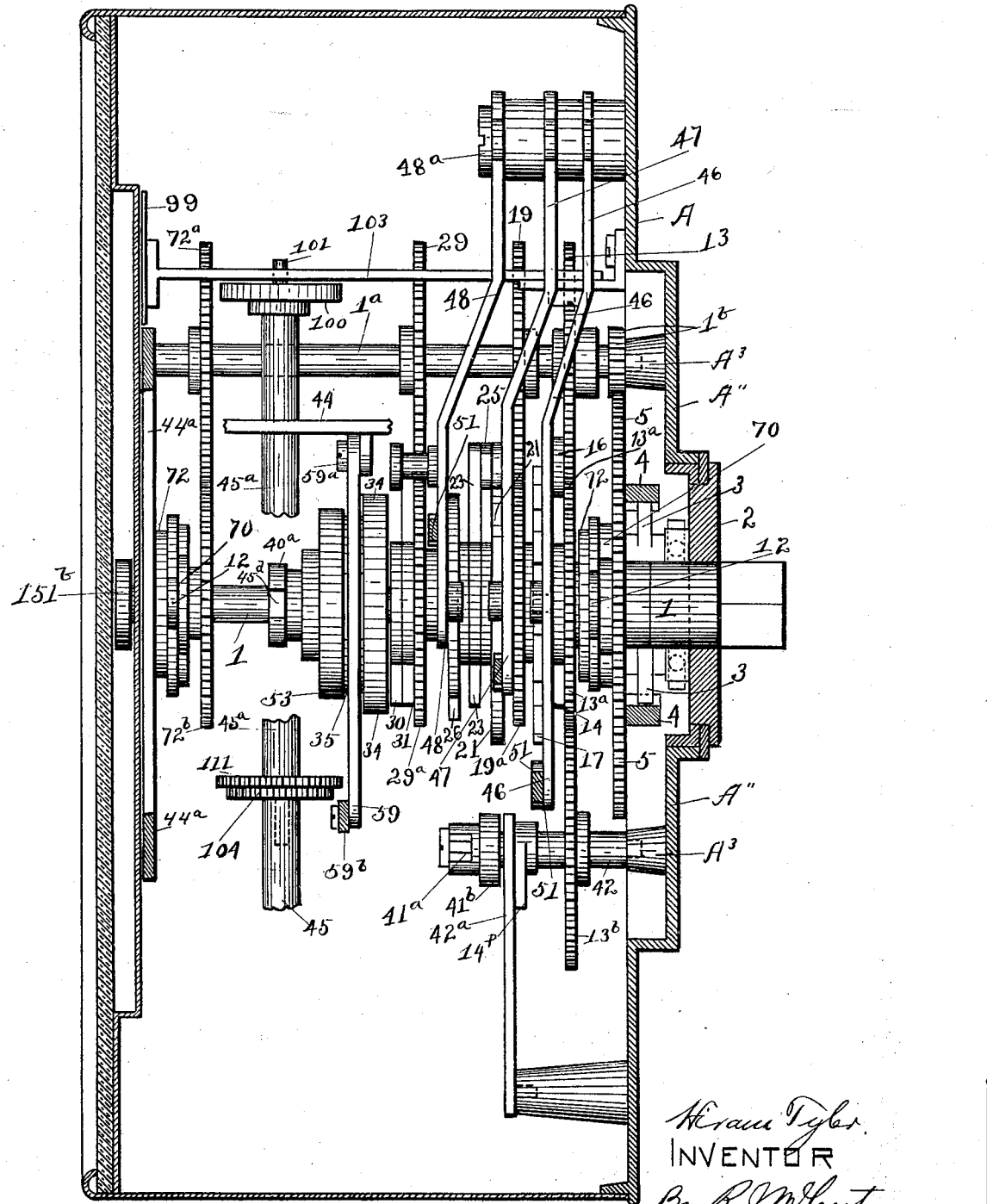
Figure 6:
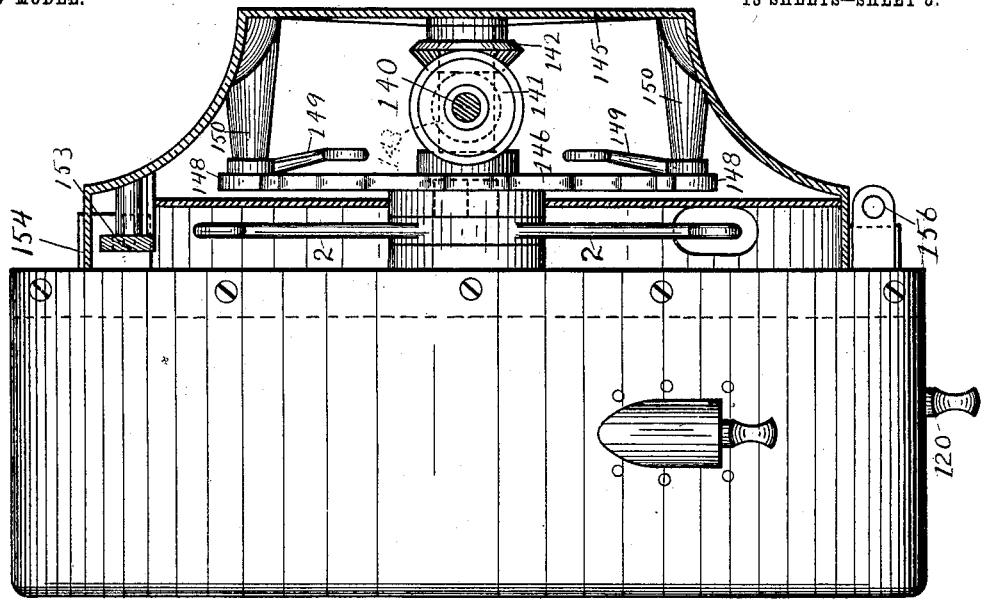
Figure 5:
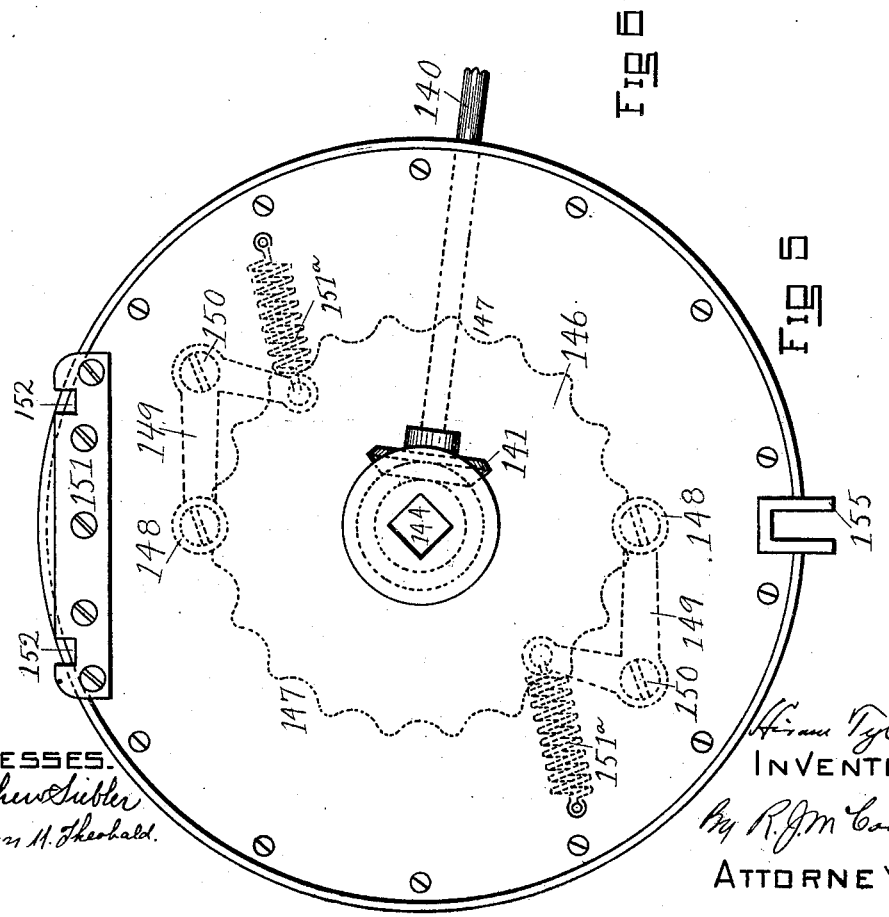
Figure 37:
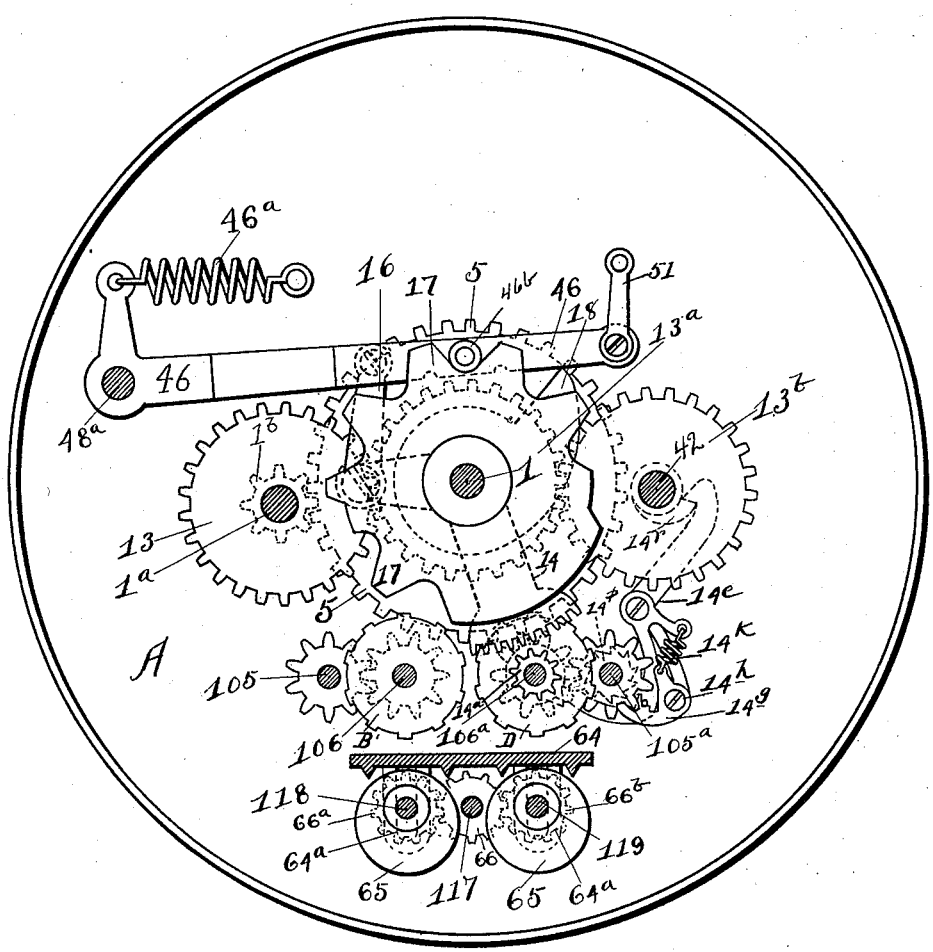
Figure 37A:
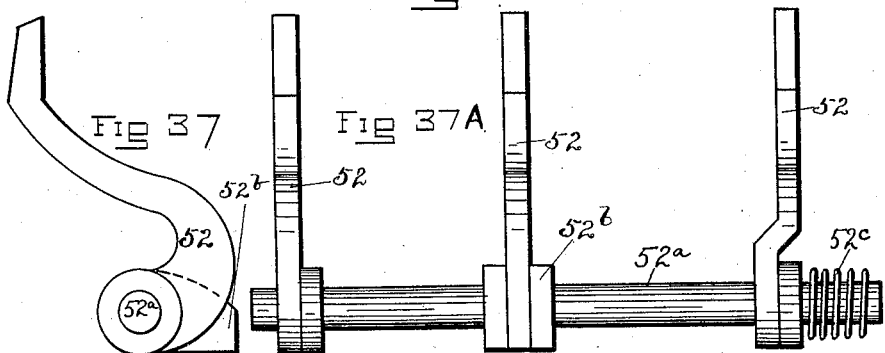
Figure 45:
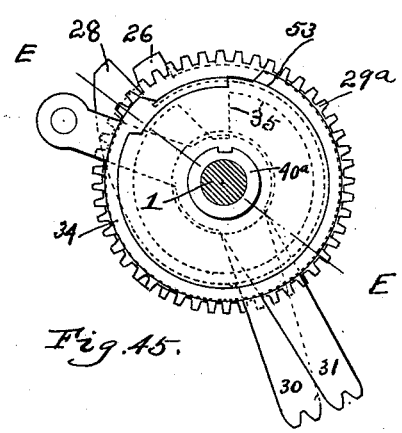
Figure 46:
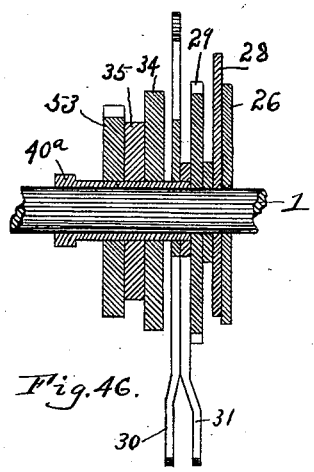

Figure 1 is a front elevation. Fig. 2 is a similar elevation with the dial or face plate removed on the vertical dotted line A A of Fig. 3. Fig. 3 is a vertical section. Fig. 4 is a horizontal section on the line B B of Fig. 3. Fig. 5 is a view of the setting mechanism. Fig. 6 is a side elevation of the register, showing the setting mechanism in operative relation therewith. Fig. 7 is a detail view of the combination mechanism. Fig. 8 is a detail view of the fare-indicator mechanism. Fig. 9 is a detail plan view of the counting-wheels. Fig. 10 is a detail view of the unit combination. Fig. 11 is a detail view of the operating mechanism. Fig. 12 is a detail of the passenger-indicator mechanism. Fig. 13 is a perspective view of the frame which supports the upper segment-gears which operate in connection with the fare-indicators. Figs. 14 and 14$^a$ are details of the locking devices. Fig. 15 is a detail of one of the sets of gearing of the fare-indicator mechanism. Fig. 16 is a detail of the check-pawls, features of the passenger-indicator mechanism shown in Fig. 12. Fig. 17 is a detail of the pawl mechanism shown in Fig. 12. Figs. 18, 19, and 20 are details of the setting-cams. Fig. 21 is a detail view of the lifting devices of the counting-wheels. Fig. 22 is a detail view of the cam and lever devices for operating the flash of the fare-indicators. Figs. 23 and 24 are detail views of the main shaft. Figs. 25 and 26 are detail views of the segment-gears operating in connection with the fare-indicator mechanism. Fig. 27 is a detail of the tripping mechanism operating in connection with the total-cash counting-wheels. Fig. 28 is a detail of a portion of the mechanism of the special consecutive-counting wheels. Figs. 29, 30, and 31 are detail views of the levers operating in connection with the fare-indicator mechanism. Fig. 32 is a detail of one of the cams of the passenger-indicator mechanism. Figs. 33 and 34 are detail views of the platen parts of the embossing mechanism. Figs. 35 and 36 are detail views of cams operating in connection with the fare-indicator mechanism. Figs. 37 and 37$^a$ are details of the fare-indicator mechanism. Fig. 38 is a detail view of a double-faced cam operating in connection with the lifting mechanism of the counting-wheels. Fig. 39 is a vertical section of the rear plate of the inclosing case. Figs. 40 and 40$^a$ are details of the pawl mechanism operating in connection with the passenger-indicators. Fig. 41, Sheet 6, is a side elevation in detail of the direction-indicator. Fig. 41$^a$ is a sectional view on the line C C of Fig. 42. Fig. 42 is a front elevation of the combination mechanism, showing the first combination. Fig. 43 is a front view showing the second combination. Fig. 44 is a sectional view on the line D D of Fig. 43. Fig. 45 is a front view showing the third combination. Fig. 46 is a sectional view on the line E E of Fig. 45.

Figure 47:
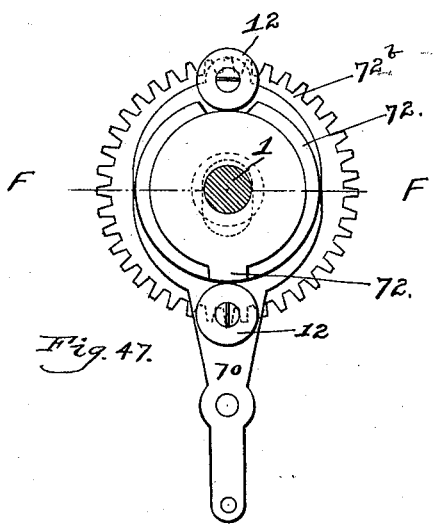
Figure 48:
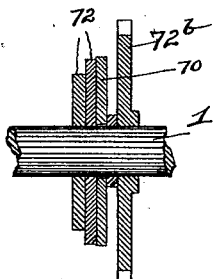

Fig. 47 is a front view of the fourth combination. Fig. 48 is a sectional view on the line F F of Fig. 47.

Proceeding to a detail description of my invention, in which similar reference characters indicate corresponding parts, Figs. 3 and 4, Sheets 3 and 4, are referred to, in which 1 designates a main central shaft supported in frame 44$^a$ and wall A and which supports and actuates the mechanism for setting the desired combination. For example, if it is desired to register a twenty-five-cent fare shaft 1 is rotated until the pointer 151 thereon is moved to a position to indicate on the dial in the front of the register that particular fare. (See Fig. 1.) The shaft remains stationary after being moved to the position indicated above, and the next operation takes place through a main operating-lever 2, which is loose upon the rear end of said shaft and carries two pawls 3, which engage with the internal teeth of a ratchet 4, said ratchet having five of such teeth. (See Fig. 11, Sheet 10.) The operating-lever 2 carries a ratchet 8 and an arm 6. The function of the ratchet 8 is to govern the action of the lever 2 by compelling a full or complete movement thereof. A double-acting or reversible pawl 9, pivoted on the inside of the casing A, engages said ratchet and compels a complete movement of the lever in a well-known manner. The arm 6 has a spring 7 connected to it, one end of which is connected to a a convenient point of the rear wall of the casing. The function of this spring is to return the lever to its normal position after each operation. The ratchet 8 and the arm 6 lie upon the inside of the casing, while the remaining portion of the lever is on the outside of the casing. (See Fig. 3, Sheet 3.) The rear wall A is especially constructed for the mounting of the operating-lever and its co-operating parts. (See Fig. 39, Sheet 3.)

Referring to Sheet 3, a sectional view of the rear wall A is shown to have an exterior annular offset A', in which the rim or flange 2' of the operating-lever 2 projects. The ratchet 8 and the arm 6 when in position lie within the offsets A''. Projecting from the inside surface of the rear wall are four bosses A$^3$, which receive the subbase 42$^a$, Fig. 4, Sheet 4, on which is mounted frame G, in which the journal 45 and other mechanism of the passenger-indicators are supported. (See Sheet 10, Fig. 12.) The internal ratchet 4 of the actuating devices is fixed to the outer face of a main driving-gear 5, the latter being mounted loosely upon shaft 1. This driving-gear 5 transmits motion to an auxiliary parallel shaft 1$^a$ through a spur-pinion 1$^b$, the larger wheel 5 having five times as many teeth as are contained on the pinion 1$^b$. Shaft 1$^a$ has bearings similar to shaft 1. The internal ratchet 4 receives the same forward movement as the spur-wheel 5, which is one-fifth ($\frac{1}{5}$) of a revolution of said wheel 5. The said ratchet 4, being fixed to the gear 5, necessarily imparts movement thereto upon each operation of lever 2, and, as before stated, movement is transmitted from the spur-wheel 5 to shaft 1$^a$ through the pinion 1$^b$. Upon each one-fifth ($\frac{1}{5}$) revolution of the spur-wheel 5 a complete revolution is given the auxiliary shaft 1$^a$. Upon said shaft 1$^a$ there is a series of spur-wheels 13, 19, 29, and 72$^a$, which are fixed thereto, and all of which are of uniform diameters. (See Sheet 4.) These spur-wheels mesh with a similar number of spur-wheels 13$^a$, 19$^a$, 29$^a$, and 72$^b$, which are loose upon the main shaft 1. Each one of these last-named spur-wheels has a fixed connection with a combination of parts, as follows: For example, wheel 13$^a$ is fixed to a counterlifting-cam 72, having the cam-surfaces, as shown in Figs. 21 and 38 on Sheet 11. Spur-wheel 72$^b$ carries a similar cam-wheel 72. Spur-wheels 13$^a$ and 72$^a$, with their respective cams 72, are mounted loose on shaft 1 and adjacent to the ends of said shaft. The functions of the cams 72 are to raise and lower the detail and the total adding counting-wheels, as shown in Fig. 9 on Sheet 8, and to be described more fully hereinafter. 70 designates two lifting-arms which have oblong openings 70$^a$ to receive shaft 1, said oblong openings permitting the necessary movements of the arms in the performance of their functions. (See Fig. 21, Sheet 11.) The said arms 70 carry upper and lower roll-studs 12, which lie in the parts of the cams 72, having a fixed relation, rotate simultaneously, and the said lifting-arms are thereby given vertical movement during the rotation of said cams, thereby lifting frame 69. The roll-studs 12 project out different distances from the lifting-arms, and one of said studs rides upon the cam-surface 72$^c$ and the other rides upon the cam-surface 72$^d$, so that when the upper roll-stud rides upon the highest periphery of the cam the lower roll-stud enters the recess, and vice versa. To the lower ends of the lifting-arms 70 there is connected a frame 69, which supports four shafts—to wit, 105 105$^a$ 106 106$^a$—upon which the several banks of counting-wheels are mounted. Shaft 105 supports the transfer-wheels of the detail-adding wheels (indicated by B) of the series of transfer-counters which are supported on shaft 106. Shaft 105$^a$ supports the transfer-wheels of the total-cash counting-wheels C. Shaft 105$^a$ also carries the transfer-wheels for a bank of total counting-wheels D, the last-named bank of wheels serving to register the totals of all the fares, both cash and tickets, and transfers. (See Fig. 9 on Sheet 8.)

Entering into a more detailed description of the counting mechanism, the bank of wheels designated by the inscription "Total-adding counters" is operated through the "unit" and "tens" segment-gears 14 and 23 engaging with pinions 14$^a$ and 14$^b$. The unit segment-gear is fixed to the pinion $14^a$ and is therefore moved thereby.

$14^c$ designates a single-tooth wheel, which is fixed to the units-wheel and trips a pawl $14^d$ upon each complete revolution of said units-wheel. The pawl $14^d$ is mounted loosely upon an arm $14^e$ and carries a pin $14^f$.

$14^g$ is a pawl of special construction, (see Fig. 27,) which is pivoted to the free lower end of the arm $14^e$ at $14^h$. The pawl $14^g$ contains notches $14^i$, which engage with the pin $14^f$ and are held in contact by means of a spring $14^k$, one end of which is secured to said pawl $14^g$, and the other end is secured to the pawl $14^d$. These pawls $14^e$ and $14^d$ and $14^g$ are all mounted on a stud-shaft $14^n$, which projects from the frame 69. In the rotation of the one-toothed wheel $14^c$ the pawl $14^d$ is tripped, which allows the pawl $14^g$ to engage the pin $14^f$ at the lowest opening $14^m$. This permits pawl $14^g$ to engage with the ratchet-wheel $14^p$ and imparts movement thereto, and through said ratchet-wheel $14^p$ movement is imparted to the tens-wheel of the total-cash counters through a spur-wheel $14^q$. The movement is conveyed to pawl $14^g$ from the arm $14^e$, which is tripped by a cam $14^r$ on shaft 42. This tripping movement of the arm $14^e$ is made upon each revolution of the shaft 42, said shaft being rotated from gears $13^a$ and $13^b$. The movement of the arm $14^e$ takes place when the segments 14 and 23 are out of mesh with pinions $14^a$ and $14^b$. From the tens-wheel the transfer to the "hundreds" and remaining wheels is made in the old and well-known manner, therefore is thought to require no description.

Referring to the bank of wheels indicated by the inscription "Special consecutive counters," the shaft $105^a$, upon which these wheels are mounted, has a fixed arm 122, which is borne down by a pin 123, projecting from the rear wall of the casing and extending through arm 122. (See Sheet 8.) The object of these stops is to hold the arm 124, which carries a pawl 125, in its lower position for said pawl 125 to engage with the ratchet 126 on the units-wheel of the bank of wheels D, which makes a total registration of all the fares collected. It will be understood that the frame 69 has a vertical movement, as hereinbefore stated, and that the stop mechanism 122 and 123 prevent the arm 124 from rising during the upward vertical movement of said frame 69, and thus allows the pawl 125 to drop into a lower notch of the ratchet 126. In the downward movement of the frame 69 the pawl 125 forces forward the ratchet 126, thus moving the units-wheel one tooth forward. Upon a complete rotation of the said units-wheel the tens-wheel is turned one notch through the regulating transfer-wheels 127 and 128.

Referring next to the two banks of wheels B and B', also indicated by the inscription, "Ticket and transfer detail counters," which are mounted on shaft 106, the spur-wheel $15^a$ is mounted loosely on said shaft 106 and has a sleeve to which the units-wheel of the transfer series is fixed. The remaining wheels of said transfer series are mounted loosely upon said sleeve. Movement is imparted to the spur-wheel $15^a$ through the segment-gear 31. The units-wheel has fixed to it a spur-wheel 129, which makes one revolution to one revolution of the units-wheel and gears with the spur-wheel 130 on shaft 105, which carries a one-toothed gear 131 and imparts movement in a complete revolution to the tens-wheel 132 one notch, and the transfer from the tens-wheel 132 to the remaining wheels of the transfer series takes place in a well-known manner. The same is true of the ticket series B', which are operated as follows: Pinion 15 receives its motion from segment-gear 30 and is connected by a sleeve 133 to a ratchet 134 and spur-gear 135 and the units-wheel 136 of the said series of ticket-counters. The transfer from the units-wheel of the said ticket-counters is made in the usual manner.

Referring further to the mechanisms for setting the combinations, on a side of the spur-wheel $19^a$ there is fixed a units operating-cam 18, and on gear $13^a$ is fastened by telescopic connection a tens operating-cam 20, both of said cams being of similar shape. The cam 18 raises lever 46. There are three of such levers—to wit, 46, 47, and 48—which have the same functions to perform and are operated in a similar manner. These levers have a fulcrum $48^a$ on the rear of the casing. As before stated, the said levers are of similar form, but are of different lengths—that is to say, levers 47 and 48 are shorter than lever 46. (See figures on Sheet 6.) As before stated, cam 18 on spur-wheel $19^a$ actuates lever 46. The two remaining levers 47 and 48 are similarly actuated or raised by the cams 20 and 28, respectively, against the tension of springs $46^a$. Cams 18 20 28 are of similar shape (see cam 28, Fig. 7, Sheet 6) and bear the same fixed relative position. $46^b$ is a roll-stud on each of said levers, which ride upon the peripheries of the respective setting-cams 17, 21, and 26, which set the particular combination operating in connection with the spur-wheels $13^a$, $19^a$, and $29^a$. These cams are fast on shaft 1, and are shown in detail on Sheet 11, also Sheet 6. It will be understood that there is one of these cams for each combination—to wit, 17, 21, and 26—and, as before stated, being fixed to shaft 1 receive their setting movement through said shaft, according to the fare to be registered and indicated. The outer end of lever 46 is connected to a segment-gear 75 by a double link 51. There are three of these segment-gears 75 of uniform construction, connected to the levers 46, 47, and 48 in a similar manner—to wit, through the double links 51. The said segment-gears are loose upon a common shaft $75^b$, which is journaled in frame 36, consisting of two side pieces connected by a cross-piece 36ª. (See Sheet 7.) The frame 36 is movable on pivot 36ᵇ on the frame 44. The setting-cam 17, which is in operative relation with one of the gear-segments 75, is designed to coöperate with the units-wheel of the fare-indicator and the units-wheel of the total-cash counting-wheels. The functions of the setting-cams are twofold and take place simultaneously in setting the machine to indicate a fare to be registered. The said cams rock the segments 75 and 14. The latter segment will be hereinafter more fully described.

34 designates a cam loosely mounted on shaft 1 and having a telescopic connection with the spur-wheel 29ª, and therefore operated from said gear by the movement of auxiliary gear 29, it being borne in mind that the shaft upon which the auxiliary gear is mounted is driven from the main drive-gear 5 on shaft 1. Cam 34 in its rotation lifts the bar 36ª, which, as before stated, is a part of the frame 36, which supports the shaft 75ᵇ of the segment-gears 75. In thus lifting said frame the segment-gears 75 are moved in mesh with the pinions 61 of the unit, tens, and "ticket" and "transfer" fare indicators E, F, and H. In registering a unit fare—such, for example, as a five-cent fare—it will be borne in mind that the segment-gears 75 of the unit combination will alone be in mesh with its respective pinion 61. In registering a fifteen-cent fare the unit and tens segment-gears 75 will be in mesh with their respective pinion 61. The remaining segment-gears 75, operating in connection with the ticket and transfer indicators, are in mesh with their respective pinion 61 only when the segment-gears operating in connection with the cash-fare indicators of the unit and tens series are out of mesh with their respective pinion 61. It will be understood that the extent of movement of the levers 46, 47, and 48 receive from their respective operating-cams 18, 20, and 28 after being set by their respective setting-cams 17, 21, and 26 depends upon the amount of throw the fare-indicators E, F, and H and the segment-gears 14, 23, 30, and 31 will receive. Each of the said levers 46, 47, and 48 has its respective segment-gear 75 connected to it, and lever 46 in addition is connected with segment-gear 14 by a link 16. (See Sheets 6 and 9.) Lever 47 is connected with segment-gear 23 through a connecting-link 25, and lever 48 is connected with segment-gears 30 and 31 through connecting-link 49. Segment-gear 14, as before stated, is connected to lever 46 and is in a position to gear with the pinion 14ª, which is on the units-wheel of the total-cash counting-wheels. The segment-gear 23, which, as before stated, is connected to lever 47, is in a position to gear with the pinion 14ᵇ of the tens-wheel of the total-cash counters. The segments 30 and 31, which are connected to lever 48, operate with pinions 15 and 15ª of the total ticket and transfer counting-wheels. When the segment-gears 14 and 23 (gear 14 being in the rear of 23, as shown in Fig. 7, Sheet 6) are in mesh with their respective pinions 14ª and 14ᵇ, the segment-gears 30 and 31 are inoperative, and when the former segments are in operative position—to wit, segments 14 and 23—the segments 30 and 31 are in their operative positions. This change in positions of the said segment-gears is due to the positions of the setting-cams 17, 21, and 26. Cam 17 controls the unit segment-gear 14, cam 21 controls the tens segment-gear 23, and cam 26 controls the ticket and transfer segment-gears 30 and 31. The said cams 17, 21, and 26, it will also be borne in mind, control the fare-indicators through the link-levers 51. Cam 21, in addition to controlling segment 23 of the tens cash counting-wheels, also controls segment 75 of the tens cash-fare indicator. The unit operating-cam 18, as before stated, is on the spur-wheel 19ª and raises lever 47 to make a registration of the tens total-cash-counting wheels and the tens cash-indicator.

35 is a cam fixed to another cam, 34, and receiving motion from gear 29 through gear 29ª. The function of cam 35 is to lift bar 59, which is pivoted at one end, 59ª, with the frame 44. The opposite end of the bar 59 is connected by a link 59ᵇ with a side plate 56 of the flash. About midway of the lever 59 there is a cam projection 59ᶜ, which bears upon the cam 35. In the operation of the machine the gear 29ª is driven forward by a gear 29 on the auxiliary shaft 1ª, moving cam 35 through cam 34 to a complete revolution. Cam 35 lifts the lever 59, which lowers the flash 56, said flash 56 being held in position by said cam until a complete revolution of said cam, which allows the flash 56 to move up under the force of a spring 57. It will be understood that the flash 56 conceals the fare-indicators partially when a complete operation is not made. The projection 59ᶜ on the lever 59 enters the recess in the cam 35 when said cam makes a complete revolution, and thus allows the flash to move up.

53 designates a cam fixed to the cam 35 and receiving motion therefrom. This cam 53 controls the retaining-pawls 52, which are pivoted on the frame 44 at 52ª and project into the paths of ratchet-wheels 75ª on the side of the fare-indicators E, F, and H. On the shaft 52ª there is a projection 52ᵇ, which is fixed in the center of said shaft and in the path of the cam 53, so that in the rotation of said cam the pawl or projection 52ᵇ is tripped thereby, causing the pawls 52 to disengage the ratchets 75ª, thus allowing the fare-indicators to return to zero. The pawls 52 are held in engagement with the ratchet-wheels by a spring 52ᶜ. (See Sheets 7 and 9.) It will be understood that cams 53, 35, and 34 are loose upon the main shaft 1 with the gear 29ª, and the segments 30 and 31 are loosely mounted between the cam 34 and the spur-gear 29ª.

40ª designates a ring or annulus which is fixed to cam 53 by means of a sleeve or telescopic connection, and 40 is a similar ring which is fixed upon shaft 45ª of the direction-indicator. One end of shaft 45ª has a bearing in a socket in the end of shaft 45. (See Fig. 4, Sheet 4.) The two rings 40 and 40ª occupy positions at right angles to each other and are provided with slots 45ᶜ and 45ᵈ. The operating-lever 2 actuates ring 40ª through the medium of the auxiliary shaft 1ª and the spur-gear 29ª. When the ring 40ª is being thus operated, the shaft 45ª of the passenger-indicators is locked against rotation by the said rings being interlocked. (See Figs. 14 and 14ª, Sheet 7.) The notches or slots 45ᶜ and 45ᵈ in said rings, it will be understood, enable this locking engagement when said slots are out of alinement with each other, and the machine thus becomes inoperative. The machine is thus placed out of an operative condition when the passenger-indicators 37 are being turned to zero. It will be seen that when the operating-lever 2 is in operation the passenger-indicators cannot be turned to zero, and while the passenger-indicators are being turned to zero lever 2 is inoperative.

Entering into a detailed description of the structural features of the passenger-indicators 37, otherwise known as the "trip-indicators," Sheets 2, 3, and 10 are referred to. The spur-wheel 13ª, which, as before stated, is loose on shaft 1 and receives its motion from the auxiliary spur-wheel 13, is in gear with a spur-wheel 13ᵇ of the same diameter as wheel 13ª. The spur-wheel 13ᵇ is fixed on a shaft 42, mounted in bearings 42ª in the rear of the passenger-indicators. One of the bearings of this shaft is in the rear wall of the casing, and the other of said bearings is in a subbase in the rear of said passenger-indicators on bosses A³. (See Sheets 4 and 3.) Shaft 42 carries upon one end a crank 41ᵇ, which is fixed thereto. 41ª is a double link pivoted to said crank and having a pivotal connection at its upper end to a shaft at 38ª, which is connected to the arms 42ᶜ, which operate the passenger-indicators through the pawls 43 and ratchet-wheel 39.

80 designates a shaft which is journaled in the frame G, supported on the subbase 81, as seen on Sheet 2. Upon Shaft 80 there is mounted a series of stop-pawls 82 and a pawl 83. The stop-pawls 82 operate as follows in turning the passenger-indicators 37 to zero: 84 is a cam fixed to shaft 45. In the rotation of this shaft in setting the passenger-indicators to zero cam 84 crosses pawl 83 to ride onto the highest periphery of said cam, and thereby rock the shaft 80 to bring the stop-pawls 82 in position to engage with pins 85, of which there is one on each of the star ratchet-wheels 86. This operation takes place in setting the passenger-indicators to zero. There are three of the star ratchet-wheels 86. It will be understood that the purpose of the cam 84 and the stop-pawls 82 is to stop the passenger-indicators at zero. The pawl 83 is forced in normal contact with the cam 84 by a compression-spring 87.

Referring to Fig. 12 on Sheet 10 and Figs. 40 and 40ª on Sheet 2, 88 designates a series of pawls fixed on shaft 89, which is journaled in the side frame G. One of these pawls has a projection 88ª, and all of said pawls coöperate with other mechanism to be described to prevent an overthrow of the passenger-indicators 37 in the operations of the machine. One of the arms 42ᶜ, hereinbefore referred to and which carries the flash 90, has a trip projection 91, which in the operation of the arms 42ᶜ descends in contact with the projection 88ª on the pawl 88 and forces the three pawls 88 in the path of the star-wheels 86, and thus checks the momentum of the passenger-indicators. 92 is a check-pawl, of which there are three, mounted on a shaft 93, which is journaled in the ends of the shaft 80. (See Fig. 16 on Sheet 8.) These pawls 92 act upon the ratchet-wheels 39 to check any retrograde movement in the operation of the passenger-indicators. The shaft 45, hereinbefore referred to and to be referred to hereinafter, is operated in turning the passenger-indicators to zero through miter-gears 94, one of which is on a two-part depending shaft 95, which projects out of the casing and has a finger-piece 96, by which it is turned. The shaft 45 has a longitudinal slot 97, which engages with a series of trip-pawls 98, of which there is one attached to each of the passenger-indicators.

I will next describe the direction-indicator 99, which operates in conjunction with the passenger-indicators 37 just described. 45ª (shown in Fig. 2 on Sheet 2, Fig. 4 on Sheet 4, and Fig. 41 on Sheet 6) designates said direction-indicator shaft, one end of which is reduced and has a socket-bearing in the end of shaft 45. The other end of shaft 45ª passes through the frame 44 on one side and in which it has a bearing. The said shaft 45ª carries at its outer end a crank-disk 100, upon which there is a stud 101, operating in an oblong slot 102 in the supporting-plate 103 of the direction-indicator 99. The direction-indicator is movable simultaneously with the resetting movements of the passenger-indicators through the following system of reduced gearing: 104 is a spur-wheel fixed upon the shaft 45 and in mesh with an idler 108 of twice the diameter of said wheel 104 and mounted upon a stud 110. The said idler 108 has fixed to it a transmission-gear 109, meshing with a gear 111 of the same diameter and on the shaft 45ª of the direction-indicator.

From the above description it will be apparent that through the rotation of shaft 45 movement is transmitted to the direction-indicator on shaft 45ᵃ, the ratio of such movement being two revolutions of the shaft 45 to one of the shaft 45ᵃ.

The bell mechanism consists of a gong 112, which is struck by hammer 113, tripped by a cam 114 on auxiliary shaft 1ᵃ.

The fare-indicators E, F, and H and the spur-pinions 61 and ratchet-wheels 75ᵃ are connected and are loose upon shaft 115. Coöperating with the ratchet-wheels 75ᵃ to prevent any backward movement of the indicators in the operations of the machine is a series of retaining-pawls 52, hereinbefore referred to. Coöperating with the spur-pinions 61 are the segments 75, hereinbefore referred to. Inclosed within each of said indicators is a coil-spring 116, one end of which is attached to an adjacent indicator and the other end to the shaft 115, the said shaft 115 passing through openings 115ᵃ in frame 36. In the operations of the machine these springs 116 are wound up, and when the indicators are released by the pawls 52 they are given over to the expanding influence of said springs and are thereby returned to zero. The said fare-indicators are prevented from retrograde movement by pins 54 striking flexible pawls 55. (See Sheet 7.)

Proceeding now to a description of the embossing mechanism by means of which statements are taken from the counting-wheels from time to time, 117, 118, and 119 designate three parallel shafts. Shaft 117 carries a miter-gear 120, which is driven from a similar gear 120 on shaft 121, that is turned by hand. Shafts 118 and 119 receive movement from shaft 117 through spur-gears 66 on the latter shaft, which mesh with spur-gears 66ᵃ and 66ᵇ on the former shafts. Shafts 118 and 119 also carry eccentrics 65, three in number and all of similar shape. (See Sheet 9.) These eccentrics lie below the platen 64, which is supported by yokes 64ᵃ, extending downwardly and encompassing the shafts 118 and 119 by means of oblong openings in said yokes. There are four of these yokes 64ᵃ, two on shaft 118 and two on shaft 119. In the rotation of the said shafts the eccentrics named make contact with the lower surface of the platen 64 and elevate the same, which contains a card, against the peripheries of the counting-wheels, and the result is an embossed impression is thereby taken from said counters, which shows at any time the total cash receipts, the total tickets and transfers, and the total number of registrations made, which includes all of the cash fares and all of the tickets and transfers that have been collected by the conductor on a given trip or for any period between the taking of two statements.

68 is a guideway having a slot 68ᵃ, which is in line with the upper side of the platen 64 and through which a ticket showing the conductor's trip-report is passed onto said platen in a position to receive the embossing impression. The guideway 68 is mounted on the front end of the platen 64 by means of slotted extensions 68ᵇ, extending laterally from the rear side of the guideway 68 and through which two or more broad-headed screws pass and enter the platen. (See Figs. 33 and 34 on Sheet 10.) The guideway 68 may be thus given horizontal movement to shift the card supported therein into a proper position to receive the impression, such position being determined by the pointer 68ᶜ projecting therefrom and the word "On" or "Off," as indicated on the front plate of the register, "On" meaning the time in which the conductor enters upon his duty and "Off" meaning the time in which his period of duty expires. (See Fig. 1.)

Proceeding to a description of the setting mechanism, reference is made to Sheet 5 of the drawings. 140 designates a setting-rod which projects from the rear of the register-casing and is turnable by being geared in any suitable manner to operating-rods. (Not shown.) The rod 140 has on its inner end a miter-gear 141, which meshes with a similar gear 142, that is fixed to a short shaft 143, one end of which is connected to the main shaft 1 by a socket 144 and the other end of which is journaled in the rear wall of the casing 145 of the setting mechanism. The setting-mechanism casing 145 is secured in position in the rear of the register-wall A by means of a plate 151, secured to the upper inner side of said casing 145 and having notches 152, which engage with notches 153 in a bar 154, projecting from the rear side of the rear wall A. The lower portion of the casing 145 has a slotted lug 155, which receives an ear 156, projecting from the lower portion of the rear wall A of the register-casing. The lugs 155 and 156 have suitable openings for a lock. 146 designates a locking-plate which is fixed to the short shaft 143 and has its periphery provided with uniform depressions 147, into which locking-rollers 148 on bell-crank levers 149 enter, the said bell-crank levers being pivoted to bosses 150, projecting from the rear wall of the casing 145. The rollers 148 are held in position by springs 151ᵃ. The functions of the plate 146 and the rollers 149 are to lock the shaft 143 at the limit of each operating movement thereof. The setting-rod 140 may be turned to bring the pointer 151ᵇ on the shaft 1 to indicate the desired fare to be registered.

Having described the various mechanisms in detail, I will now give a detail description of the operation thereof. Assuming that a twenty-five-cent fare is to be registered, the setting-rod 140 is given the necessary turn to move the pointer 151ᵇ to a position to indicate "25" on the dial. (See Fig. 1.) This movement of said setting-rod brings the setting-cams 17, 21, and 26 in the position shown in Fig. 7 on Sheet 6. In this position the units-cam 17 will register "5" on the units-wheel of the fare-indicator and "5" on the units-wheel of the total-cash counters and the tens-cam 21 will be in a position to register "2" upon the fare-indicator and "2" on the tens-wheel of the total-cash counter and cam 26 will be thrown into an inoperative position. The operating-lever 2, which is attached to a suitable operating member—for example, a rope—(not shown) is next in order drawn upon. This movement of said operating-lever imparts movement to the main driving-gear 5 a one-fifth of a revolution through the internal ratchet 4 and pawls 3. The main gear 5 and the operating-lever 2, it will be borne in mind, are loose upon shaft 1, and the gear meshes with pinion 1$^b$ on the auxiliary shaft 1$^a$. Shaft 1$^a$ in turn imparts movement, as hereinbefore stated, through the spur-gears 13, 19, 29, and 72$^a$ to the corresponding spur-gears 13$^a$, 19$^a$, 29$^a$, and 72$^b$ on the main shaft 1. On spur-gears 13$^a$ and 72$^b$ are fixed the double lifting-cams 72, the functions of which are to lift the counting-wheel mechanism into a position for the respective pinions 14$^a$ and 14$^b$, 15$^a$ and 15$^b$ to engage the segment-gears 14, 23, 30, and 31 on shaft 1 and linked to the levers 46, 47, and 48. Attached to the free ends of said levers 46 and 47, as before stated, are the double links 51, which are pivotally connected to the two segment-gears 75, operating in connection with the pinions 61 of the cash-fare indicator-wheels. These segment-gears 75 are moved in mesh with the pinions through the cam 34, which, as before stated, is mounted loosely on shaft 1 and is driven by the spur-gear 29$^a$ through a telescopic connection. The cam 34 lifts the frame 36, which supports the fulcrums of the segment-gears 75. This places the various parts in operative relation with each other, the spur-gear 19$^a$ having fixed to it the operating-cams 18 and 20, which lift the levers 46 and 47 and raise them, and thereby cause the segment-gears 14 and 23 to impart movement to the pinions 61, with which they operate. During this period of operation of the lever 2 the cam 53 releases pawls 52 from the ratchet-wheels 75$^a$ of the cash-indicator and allows the cash-indicators E and F to return to zero from a previous operation. The flash 56 is operated by cam 35 lifting the bar 59 through a link 59$^b$, said link being connected, as hereinbefore stated, to one arm, 56$^a$, of the flash, which imparts a downward movement to said flash and retains it in this position until the operation is complete, when it is released by the lug 59$^c$ entering the recess in cam 35. The flash indicates "No record." The main operating-lever 2 returning to its normal position through the influence of spring 7 carries the pawls 3 back for a new engagement with the ratchet 4.

The machine as described above in its operation is set for a twenty-five-cent fare and requires no further alteration or ajustment as long as this particular denomination of fare is to be registered; but it will be understood that in resetting the machine for the registration of a different fare—for example, a transfer—the setting-rod 140 is turned to move the pointer to indicate a transfer, and the setting-cams 17, 21, and 26 are moved in a manner hereinbefore described; but the said cams and segment-gears are moved out of their former positions by this resetting operation. The movement of the setting mechanism places the segments 30 and 31 in positions to operate the pinions 15$^a$ and 15$^a$. Also the segment-gears 75 of the ticket and transfer indicators are moved in position to engage the pinions 61 of the ticket and transfer indicators, and the said movement also throws into an inoperative position segment-gears 14 and 23 and all the mechanism operated thereby.

It will be remembered that the units, tens, and ticket and transfer cams, as shown on Sheets 6 and 11, are the only fixed members on shaft 1 and that these cams have a definite relative position which corresponds to the indications of the fares as shown on the dial or front face of the machine. It will also be understood that in order to vary the indications shown on said dial a corresponding variation in the working surfaces of the cams must be made. Referring to the specific features of these cams, attention is directed to the tens-cam, which, it will be observed, has a series of working surfaces of uniform graduations and numbered consecutively from "1$^x$" to "9$^x$" with a higher non-working or zero surface which lies between "1$^x$" and "9$^x$." The working surface of each graduation is equal to two working surfaces of the units-wheel 17, which permits a combination between two different fares—for example, a ten-cent fare and a fifteen-cent fare. It will be seen that the height of these graduations on the tens-wheel does not change in those two positions. The working surfaces on the tens-cam are so arranged that the surface indicated by "1$^x$" takes care of all registrations between ten and nineteen, working surface "2$^x$" of the tens-wheel takes care of all registrations from twenty to twenty-nine, and working surface "3$^x$" takes care of all registrations from thirty to thirty-nine, and so on until the working surface "9$^x$" is reached, which takes care of all fares between ninety and ninety-nine. The surface marked "0" registers "0" and corresponds to the working surfaces on the ticket and transfer cam 26. The function of the units-cam 17 is similar to the function of the tens-cam 21 and differs therefrom only in being cut for different combinations. The two depressions indicated by 3$^y$ are designed for a three-cent registration on the units-wheel, and the depressions 5$^y$ are designed for a five-cent registration, while the surfaces indicated by zero are designed for "0" registrations or the even-tens registration. It will be understood that when cams 17 and 21 are in position at zero cam 26 is in a position to register a ticket or transfer, the lower working surface 26$^a$ being the "ticket-surface" and the higher working surface 26$^b$ being the "transfer-surface." Looking at Fig. 7, Sheet 6, it will be seen that the two working surfaces on the tens-cam (indicated by 2$^x$) are directly opposite the five-cent working surface 5$^y$ of the units-cam 17. This setting of the cams 17 and 21 is permanent, and various combinations of fares in accordance with the valuations of the particular graduations of the cams may be made. Said cams as shown and described have a capacity for registering up to a ninety-nine-cent fare. In order to increase the capacity to register, for example, a ninety-nine-cent fare, an additional working surface must be provided on the unit-cam 17 with a valuation of "nine." In setting the combination for, say, a thirty-five-cent fare the cams 17 and 21, having, as before stated, fixed relative positions, are rotated until the working surfaces 3$^x$ and 5$^x$ are brought to a position to engage the roll-studs 46$^b$ on levers 46 and 47.

Referring to Fig. 15 on Sheet 7, it will be seen that the segment-gear operating with the cash-unit pinion 61 has a series of teeth from "1" to "0," which correspond to the number of teeth or depressions on the pinion. When the said segment is thrown into mesh with the pinion in the positions as shown, it will operate said pinion five notches, or a one-half revolution thereof. The segment-gear 75, which operates in connection with the pinion 61 of the tens-wheel, operates in a similar manner; but only two teeth of this segment-gear act upon the pinion. The segment-gear 75 of the ticket and transfer series acts upon its respective pinion 61 in a similar manner. If a ticket is to be registered and indicated, only one tooth of the segment-gear acts upon the pinion. If a transfer is to be registered and indicated, two teeth of the segment-gear act upon the pinion.

The passenger-indicator operates as follows: The movement of the spur-gear 13$^a$ is imparted to the spur-gear 13$^b$ on the short shaft 42, which, as before stated, has fixed to it the crank-arm 41$^b$. Pivoted on the end of said crank-arm is a double link 41$^a$, which connects to the flash-arm 30$^a$ through the stud connection 38$^a$. In the rotation of the shaft 42 an upward movement is imparted to the crank 41$^b$ and thence to the flash-arm 38 to throw the pawl 43 forward one notch. This operation is simultaneous with the operation of the main actuating-lever 2 and the master-gear 5.

Having described my invention, I claim—

1. In a fare-register, a dial upon which the various fares are indicated, a hand adapted to be brought into positions to indicate said fares, a shaft to which said hand is fixed, and a series of setting-cams fixed to said shaft.

2. In a fare-register, a dial upon which the various fares are indicated, a hand adapted to be brought into positions to indicate said fares, a shaft to which said hand is fixed, a series of setting-cams fixed to said shaft, a series of counting-wheels upon which various fares are recorded as per the dial, and mechanism adapted to actuate said counting-wheels, the said mechanism being first placed in operative relation with said counting-wheels by the setting-cams.

3. In a fare-register, a series of counting-wheels upon which are recorded all the cash fares, mechanism for actuating said counting-wheels, a fare-indicator to exhibit the fares recorded on said counting-wheels, mechanism for actuating said fare-indicator, a series of setting-cams controlling the positions of said actuating mechanisms, a common shaft upon which said cams are mounted, and a parallel shaft with means thereon through which said cam-shaft is operated.

4. In a fare-register, a series of counting-wheels upon which the tickets are recorded, a series of counting-wheels upon which the transfers are recorded, mechanism for actuating each set of said counting-wheels, fare-indicators to exhibit the tickets and transfers as recorded, means for actuating said fare-indicators, setting-cams to bring into operative relation said counting-wheels, fare-indicators and their respective mechanisms, said cams being upon a common operating-shaft, and a separate parallel shaft geared to said cam-shaft and through which said cam-shaft is actuated.

5. In a fare-register, a series of counting-wheels upon which the cash fares alone are recorded, a fare-indicator to exhibit the fares so recorded, a series of setting-cams, a common shaft upon which said cams are mounted, a separate parallel shaft by which said cam-shaft is operated, mechanism adapted to be brought into operative relation with said counting-wheels and fare-indicator by said cams, and means for operating said mechanism to record and indicate the cash fares.

6. In a fare-register, a series of counting-wheels upon which the tickets alone are recorded, a series of counting-wheels upon which transfers alone are recorded, fare-indicators to exhibit the tickets and transfers as recorded, a series of setting-cams, a common shaft upon which said cams are mounted, an auxiliary shaft geared to said cam-shaft and by which it is operated, actuating mechanism adapted to be brought into operative relation with said counting-wheels and fare-indicators by said cams, and means for imparting the necessary movement to said mechanism to record and indicate the tickets and transfers.

7. In a fare-register, a series of counting-wheels upon which the cash fares alone are recorded, a fare-indicator to exhibit the cash fares as recorded, mechanism adapted to actuate said counting-wheels and fare-indicator, a series of setting-cams controlling the positions of the actuating mechanism, a shaft upon which said cams are fixed, an auxiliary shaft geared to said cam-shaft, and means for transmitting movement through said auxiliary shaft to record and indicate the cash fares.

8. In a fare-register, a dial upon which the various fares are shown, a hand adapted to be brought into positions to indicate said fares, a series of counting-wheels upon which the cash fares alone are recorded, setting-cams mounted upon a shaft to which the hand is secured, an auxiliary shaft geared to said cam-shaft and by which it is operated, and actuating mechanism for said counting-wheels, the said mechanism being controlled in its positions by the setting-cams.

9. In a fare-indicator, a series of counting-wheels upon which the total of the cash fares alone is recorded, a series of counting-wheels upon which the total of the tickets alone is recorded, a series of counting-wheels upon which the total of the transfers alone is recorded, a series of counting-wheels upon which the grand total of all the fares is recorded, a movable frame upon which said counting-wheels are supported, means for elevating and lowering said frame and counting-wheels, and devices actuated through the elevating movement of said frame to impart movement to the series of counting-wheels upon which the grand total of all the fares is recorded.

10. In a fare-register, a series of counting-wheels upon which is recorded the grand total of all the different fares recorded, a movable frame upon which said wheels are supported, means for elevating and lowering said frame, and means actuated through the elevating movement of said frame to impart movement to said wheels.

11. In a fare-register, a series of counting-wheels upon which is recorded the total of the cash fares, a series of counting-wheels upon which is recorded the total tickets, a series of counting-wheels upon which is recorded the total transfers, a series of counting-wheels upon which is recorded the grand total of all the fares, a movable frame upon which said several series of wheels are supported, means for actuating said frame and the several series of counting-wheels, devices for actuating the counting-wheels upon which the grand total of all the fares is recorded, said devices being operative during the movement of said frame, separate sets of actuating mechanisms for the total cash fares, the tickets and the transfer counting-wheels, setting mechanism adapted to bring the total-cash-fare counting-wheels, the total-ticket counting-wheels, and the total-transfer counting-wheels, and their respective actuating mechanisms into operative relation prior to the elevation of said counting-wheels, and means for imparting movement to said actuating mechanisms.

12. In a fare-register, a dial upon which the various fares are inscribed, a main shaft, a hand or pointer upon said shaft to point to the various fares upon the dial, a series of setting-cams upon said shaft, different combinations each of which operates in connection with a specific fare, said combinations being set by the setting-cams, and means for actuating said mechanism after the same has been set by said cams.

13. In a fare-register, a dial upon which the various fares are inscribed, a main shaft, a hand or pointer upon said shaft, a series of setting-cams upon said shaft, the hand or pointer and the setting-cams being movable concurrently, the one to point to the desired fare on the dial, and the other to set the mechanism of the register to record the particular fare shown upon the dial, and means for actuating the mechanism of the register after the same has been set for the desired fare.

14. In a fare-register, a dial in front of the register and upon which are inscribed the fares of the various classes, a pointer movable over the face of said dial to indicate the fares recorded, counting-wheels upon which are recorded the fares as indicated upon the dial, fare-indicators to exhibit the specific fare recorded on said counting-wheels and indicated upon said dial, setting-cams to set the mechanism which actuates said counting-wheels and said fare-indicators, a common shaft upon which said cams and the dial-pointer are mounted, and an auxiliary shaft geared to said common shaft and from which it is operated to set the cams in the desired positions for recording and indicating the specific fares.

15. In a fare-register, a dial upon which are inscribed the fares of the various classes, a dial or pointer movable over the face of said dial to indicate each specific fare prior to the recording thereof, setting-cams to actuate the mechanism of the register to move the same to operative positions, the said setting-cams and the dial-hand being movable simultaneously, counting-wheels upon which the fares of the various classes as shown upon the dial are recorded, specific indicators to exhibit each fare as shown upon the dial and as recorded upon the counting-wheels, an auxiliary shaft geared to the shaft upon which the dial-hand and the setting-cams are mounted and through which said dial-hand and cams are simultaneously actuated to the desired positions, and means for actuating the mechanism of the register after the dial-hand and the cams have been set to the desired positions.

16. In a fare-register, counting-wheels for recording the different classifications of fares, a frame upon which said counting-wheels are mounted, lifting devices upon the main shaft for actuating said frame to raise the counting-wheels, an auxiliary shaft, gearing interposed between said shafts for actuating said lifting devices, and operating means for imparting movement to said gearing.

17. In a fare-register, counting-wheels for recording the different groups of fares, a movable frame upon which said counting-wheels are mounted, lifting-cams on the main shaft through which said frame and the counting-wheels are moved, spur-wheels on the main shaft to which said lifting-cams are fixed, a main driving spur-wheel on said shaft, an operating-lever upon said shaft, an auxiliary shaft, and transmission-gears on said auxiliary shaft, said transmission-gears being actuated through the operating-lever and the main driving spur-wheel to impart movement to the lifting-cams.

18. In a fare-register, counting-wheels upon which the various fares are recorded, fare-indicators upon which the fares recorded are indicated, means adapted to actuate said counting-wheels and fare-indicators, levers to which said actuating means are coupled, setting-cams adapted to set said levers to the desired positions, and operating-cams acting upon said levers after their setting movements have been obtained.

19. In a fare-register, counting-wheels upon which the fares are recorded, fare-indicators upon which the fares recorded are indicated, gearing adapted to actuate said counting-wheels and fare-indicators, levers to which said gearing is connected, setting-cams adapted to set said levers to the desired positions, and operating-cams acting upon said levers after their setting movements are obtained, and whereby the counting-wheels and fare-indicators are simultaneously actuated.

20. In a fare-register, a dial upon which the fares to be registered are exhibited, means to indicate upon said dial what fare is to be registered, segment-gears, cams adapted to operate said segment-gears in connection with the means for exhibiting the fare on the dial, a series of counting-wheels, means for taking a statement of the fares recorded on said counting-wheels, and means to effect an engagement and a disengagement between the counting-wheels and their segment-gears.

21. In a fare-register, a dial having inscribed thereon the various fares registrable, a pointer adapted to indicate on said dial each fare to be registered, a series of setting-cams to set the desired fare to be registered, said cams and pointer being movable at the same time, a series of counting-wheels upon which the total cash fares are recorded, a fare-indicator upon which the fare is to be registered is indicated subsequently to the indication of said fare upon the dial, and actuating mechanisms for said counting-wheels and said fare-indicator, said actuating mechanisms being brought into a position to be operated by the movement of the setting-cams and the pointer.

22. In a fare-register, a dial having inscribed thereon the various fares registrable, a pointer to indicate on said dial the fares to be registered, setting mechanism adapted to select the fare to be registered, a common operative shaft upon which said pointer and said setting mechanism are mounted, said setting mechanism and the pointer being movable simultaneously, a member exterior to the register through which said setting mechanism and the pointer are actuated.

23. In a fare-register, a dial having inscribed thereon the various fares registrable, a pointer to indicate on said dial each fare to be registered, setting mechanism adapted to set the desired fare to be registered, a common operative shaft upon which said pointer and said setting mechanism are mounted, the said setting mechanism and the pointer being movable at one and at the same time, an actuating member adapted to operate or move said setting mechanism and said pointer, and means for arresting the movement of said actuating member.

24. In a fare-register, a dial upon which the various fares are registrable, a pointer to indicate on said dial each fare to be registered, a series of setting-cams through which the mechanism of the register is selected for operation, a common shaft upon which said pointer and said cams are mounted, said setting-cams and pointer being movable concurrently, sets of counting-wheels upon which the total cash fares, the total tickets, the total transfers, and a grand total of all the fares are recordable, and means for taking a statement from said counting-wheels showing the totals of the fares registered.

25. In a fare-register, a dial having inscribed thereon the various fares registrable, a pointer to indicate on said dial the fares to be registered, sets of counting-wheels upon which the various classifications of fares are recorded, fare-indicators upon which the specific fares of the various classification are indicated, mechanisms through which said counting-wheels and said fare-indicators are operated, setting mechanism adapted to bring into operative positions said mechanisms through which the counting-wheels and the fare-indicators are operated, said setting mechanism and the pointer being mounted upon a common shaft and movable at the same time.

26. In a fare-register, a series of fare-indicators upon which the different fares are exhibited, each of said indicators having its own spur-pinion, a series of gears adapted to actuate said indicators through engagement with their respective pinions, a pivotal frame upon which said gears are mounted, levers having a pivotal connection with each of said gears, setting mechanism adapted to actuate said levers to bring the desired gear in operative relation with its respective pinion on a fare-indicator, means for actuating the pivotal frame to bring the selected gear in mesh with its respective pinion, and means for actuating the lever connected to such gear to cause the desired rotation of a fare-indicator.

27. In a fare-indicator, a combination of setting-cams, a combination of levers arranged in the paths of said setting-cams, a series of segment-gears flexibly connected to said levers and which are affected by the setting movements of said levers through the combination of cams, a pivotal frame upon which said segment-gears are mounted, a series of fare-indicators each of which has a pinion adapted to engage with a respective segment-gear, a cam adapted to actuate said frame to cause an engagement of a segment-gear with one of said pinions after said segment-gear has been moved in a proper position to enable such engagement, a lifting-cam for each of the levers, all of said cams being mounted on a common shaft.

28. In a fare-register, a series of fare-indicators each of which has a driving-pinion, a series of gears adapted to actuate said fare-indicators through said pinions, a series of setting-cams, a series of link-and-lever connections interposed between said setting-cams and said gearing and through which said gearing is moved by the setting-cams to operative positions relatively to the pinions, a main shaft upon which said setting-cams are mounted, means for effecting an engagement between said gears and their respective pinions after the setting-cams have moved said gears to a proper position a lifting-cam adapted to actuate each of said gears after such engagement has been effected, and an operating device through which said lifting-cams are actuated.

29. In a fare-register, a series of counting-wheels upon which the total cash fares are recorded, a fare-indicator upon which the cash fares are recorded, levers, segment-gears flexibly connected to said levers and adapted, when brought into operative relation with the counting-wheels and the fare-indicator, to impart movement to the same, setting mechanism adapted to move said segment-gears into operative positions through said levers, and means for actuating said levers after they receive their setting movements and whereby movement is imparted to the counting-wheels and the fare-indicator.

30. In a fare-register, a series of counting-wheels upon which the tickets are recorded, a series of counting-wheels upon which the transfers are recorded, segment-gears adapted to impart movement to said counting-wheels, a lever to which said segment-gears are flexibly connected, a setting-cam adapted to set said lever and therewith the segment-gears, means for elevating the counting-wheels to a position to be engaged by their segment-gears when the latter have been set, and means for actuating the lever to impart movement to the counting-wheels.

31. In a fare-register, counting-wheels upon which the tickets are recorded, counting-wheels upon which the transfers are recorded, indicators upon which said tickets and transfers are exhibited, a lever, segment-gears adapted to impart movement to the ticket-counting wheels, the transfer counting-wheels and the fare-indicators, setting mechanism adapted to move said lever and therewith the segment-gears into operative relation with the counting-wheels and the fare-indicators, an actuating-cam adapted to impart movement to said lever after it receives its setting movement, means for moving the counting-wheels and the indicators in gear with their actuating-segments after the latter have received their setting movements, and means for actuating the lifting-cam of said lever to impart movement to the counting-wheels and the indicators.

32. In a fare-register, a dial upon which the various fares are inscribed, counting-wheels upon which the different classes of fares are recorded, fare-indicators upon which each specific fare is exhibited, mechanisms for actuating the counting-wheel mechanism, and the fare-indicator mechanism, a shaft, a pointer and setting-cams fixed upon said shaft and movable simultaneously therewith; the pointer to indicate upon the dial each fare to be registered, and the setting-cams to move the actuating mechanisms of the counting-wheels and the fare-indicators into operative positions, and operating mechanism through which the fares are recorded and indicated.

33. In a fare-register, a dial upon which the fares are inscribed, a series of counting-wheels upon which the fares are recorded, fare-indicators upon which the fares are indicated, a passenger-indicator, setting mechanism adapted to indicate upon the dial the fare to be registered and indicated, a main shaft upon which said setting mechanism is mounted, actuating means interposed between said main shaft and the passenger-indicator, and operating devices to simultaneously impart movements to the counting-wheel driving mechanism, the fare-indicator driving mechanism and the passenger-indicator driving mechanism.

34. In a fare-indicator, indicators upon which the fares are exhibited, mechanism for actuating said indicators, setting mechanism through which the fare to be indicated is selected and the mechanism for actuating the indicator of the selected fare is set, a movable frame upon which the actuating mechanism of said fare-indicator is mounted, retaining-pawls controlling the positions of the fare-indicators, a flash adapted to move over the face of the fare-indicators and to disappear upon each complete operation of said indicators, a series of cams, one of which is adapted to actuate the frame which supports the actuating mechanism of the fare-indicators, another of which controls the retaining-pawls of the fare-indicators, and another of which controls the mechanism through which the flash is operated, a common shaft upon which said cams and the setting mechanism are mounted, an auxiliary shaft, and driving mechanism interposed between said auxiliary shaft and said cams and through which said cams are actuated.

35. In a fare-register, a dial upon which are inscribed the various fares, counting-wheels upon which the total cash fares are separately recorded, the total tickets are separately recorded, the total transfers are separately recorded, and a grand total of all the fares is separately recorded, a separate set of actuating mechanism operating in connection with each separate set of counting-wheels, setting mechanism adapted to simultaneously indicate upon the dial the fare to be recorded, and to select the actuating mechanism of that specific set of counting-wheels, a main shaft upon which said setting mechanism is mounted and through which said setting mechanism is actuated, means upon said shaft for actuating the selected counting-wheel mechanism, an auxiliary shaft, driving mechanism through which motion is transmitted from said auxiliary shaft to the mechanism upon the main shaft which actuates the selected counting-wheel mechanism, and operating devices mounted upon the main shaft and through which motion is transmitted to the driving mechanism upon the auxiliary shaft.

36. In a fare-register, a dial upon which are inscribed the various fares, counting-wheels upon which the total cash fares are separately recorded, the total tickets are separately recorded, and the total transfers are separately recorded, a fare-indicator operating in connection with each set of counting-wheels, actuating mechanism operating in connection with each set of counting-wheels and each fare-indicator, setting mechanism adapted to simultaneously indicate upon the dial a fare to be recorded and to select the desired actuating mechanisms of that set of counting-wheels and that fare-indicator, a main shaft upon which said setting mechanism is mounted and through which said setting mechanism is operated means upon said shaft for actuating the selected counting-wheel mechanism and fare-indicator mechanism, an auxiliary shaft, driving mechanism upon said auxiliary shaft and through which motion is imparted to the mechanism upon the main shaft which actuates the selected counting-wheel mechanism and fare-indicator mechanism, and operating devices mounted upon the main shaft and through which motion is transmitted to the driving mechanism upon the auxiliary shaft.

37. In a fare-register, a dial upon which are inscribed the various fares, counting-wheels upon which the total cash fares are separately recorded, the total tickets are separately recorded, and the total transfers are separately recorded, a fare-indicator operating in connection with each set of counting-wheels, actuating mechanism operating in connection with each set of counting-wheels and each fare-indicator, setting mechanism adapted to simultaneously indicate upon the dial a fare to be recorded and to select the desired actuating mechanisms of that set of counting-wheels and that fare-indicator, a main shaft upon which said setting mechanism is mounted and through which said setting mechanism is operated, means upon said shaft for actuating the selected counting-wheel mechanism and fare-indicator mechanism, an auxiliary shaft, driving mechanism upon said auxiliary shaft and through which motion is imparted to the mechanism upon the main shaft which actuates the selected counting-wheel mechanism and fare-indicator mechanism, operating devices mounted upon the main shaft and through which motion is transmitted to the driving mechanism upon the auxiliary shaft, and means for compelling a complete movement of said operating devices.

38. In a fare-indicator, a dial upon which are inscribed the various fares, counting-wheels upon which the total cash fares are separately recorded, the total tickets are separately recorded, and the total transfers are separately recorded, a fare-indicator operating in connection with each set of counting-wheels, means for preventing an overthrow of said fare-indicators, actuating mechanism operating in connection with each set of counting-wheels and each fare-indicator, setting mechanism adapted to simultaneously indicate upon the dial a fare to be recorded and to select the desired actuating mechanisms of that set of counting-wheels and that fare-indicator, a passenger-indicator, a main shaft upon which said setting mechanism is mounted and through which said setting mechanism is operated, means interposed between said shaft and the passenger-indicator for imparting movement to the latter, means upon said shaft for actuating the selected counting-wheel mechanism and fare-indicator mechanism, an auxiliary shaft, driving mechanism upon said auxiliary shaft and through which motion is imparted to the mechanism upon the main shaft which actuates the selected counting-wheel mechanism and fare-indicator mechanism, and to the mechanism through which movement is imparted to the passenger-indicators.

39. In a fare-register, setting mechanism adapted to simultaneously select and indicate a fare to be registered, a main shaft upon which said setting mechanism is rigidly mounted, driving mechanism for the selected fare loosely mounted upon said main shaft, operating devices loosely mounted upon said main shaft, an auxiliary shaft, and a series of transmission-gears which receive motion from the operating devices on the main shaft and transmit it to the driving mechanism on the main shaft through which the selected fare mechanism is actuated.

40. In a fare-register, counting-wheels upon which the various classifications of fares are recorded, fare-indicators upon which the specific fares are exhibited, setting mechanism adapted to select the fare to be recorded and indicated, actuating mechanisms adapted to impart movements to the devices which are set by the setting mechanism, the said actuating mechanism and the said setting mechanism being mounted upon the main shaft, passenger-indicators, actuating mechanism therefor interposed between said main shaft and said passenger-indicators, operating devices loosely mounted on said main shaft, an auxiliary shaft, and a series of transmission-gears on said auxiliary shaft which receive motion from the operating mechanism and transmit motion simultaneously to the mechanism which actuates the selected counting-wheel and fare-indicator, and to the actuating mechanism of the passenger-indicators.

41. In a fare-register, a dial upon which are inscribed the various fares, setting mechanism by means of which the fare to be recorded is selected and indicated, a shaft upon which said setting mechanism is mounted, an operating member projecting from the register-casing and geared to said shaft, and whereby the setting mechanism is actuated, means upon said main shaft through which the selected mechanism is actuated, operating devices loosely mounted upon said shaft, an auxiliary shaft, and a series of transmission-gears on said shaft, the said gears being actuated by the operating mechanism to transmit movements to the actuating mechanism through which the selected fare is recorded.

In testimony whereof I affix my signature in presence of two witnesses.

HIRAM TYLER.

Witnesses:
R. J. McCarty,
John F. Ohmer.